US006676858B2

(12) United States Patent
Vandersall et al.

(10) Patent No.: US 6,676,858 B2
(45) Date of Patent: *Jan. 13, 2004

(54) COLORANT LIQUID, METHOD OF USE, AND WILDLAND FIRE RETARDANT LIQUIDS CONTAINING SAME

(75) Inventors: Howard L. Vandersall, Upland, CA (US); Gary H. Kegeler, Diamond Bar, CA (US)

(73) Assignee: Astaris LLC, St. Louis, MO (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/032,595

(22) Filed: Dec. 26, 2001

(65) Prior Publication Data

US 2002/0189492 A1 Dec. 19, 2002

Related U.S. Application Data

(63) Continuation-in-part of application No. 09/261,497, filed on Mar. 3, 1999, now Pat. No. 6,447,697.

(51) Int. Cl.[7] .................... C09K 21/00; A62C 5/00; A62C 39/00
(52) U.S. Cl. .................... 252/602; 252/7; 252/603; 252/607; 252/610

(56) References Cited

U.S. PATENT DOCUMENTS

| | | | | |
|---|---|---|---|---|
| 2,858,895 A | * | 11/1958 | Connell | 169/45 |
| 3,223,649 A | | 12/1965 | Langguth | 252/389 |
| 3,245,904 A | * | 4/1966 | Young | 252/7 |
| 3,257,316 A | | 6/1966 | Langguth et al. | 252/2 |
| 3,275,566 A | | 9/1966 | Langguth | 252/389 |
| 3,293,189 A | | 12/1966 | Morgenthaler | 252/387 |
| 3,309,324 A | | 3/1967 | Langguth et al. | 252/387 |
| 3,338,829 A | | 8/1967 | Langguth et al. | 252/2 |
| 3,342,749 A | | 9/1967 | Handleman et al. | 252/389 |
| 3,350,305 A | | 10/1967 | Langguth et al. | 252/2 |
| 3,354,084 A | | 11/1967 | Katzer | 252/2 |
| 3,364,149 A | | 1/1968 | Morgenthaler | 252/393 |
| 3,409,550 A | | 11/1968 | Gould | 252/8.1 |
| 3,634,234 A | | 1/1972 | Morgenthaler | 252/7 |
| 3,730,890 A | | 5/1973 | Nelson | 252/7 |
| 3,960,735 A | | 6/1976 | Lacey | 252/2 |
| 4,101,485 A | | 7/1978 | Brooks et al. | 260/29.4 |
| 4,145,296 A | | 3/1979 | Fox et al. | 252/8.1 |
| 4,168,239 A | | 9/1979 | Mertz et al. | 252/2 |
| 4,272,414 A | | 6/1981 | Vandersall | 252/602 |
| 4,447,336 A | | 5/1984 | Vandersall | 252/7 |
| 4,447,337 A | | 5/1984 | Adl et al. | 252/7 |
| 4,606,831 A | | 8/1986 | Kegeler et al. | 252/7 |
| 4,770,794 A | | 9/1988 | Cundasawmy et al. | 252/3 |
| 4,839,065 A | | 6/1989 | Vandersall | 252/603 |
| 4,971,728 A | | 11/1990 | Vandersall | 252/603 |
| 4,983,326 A | | 1/1991 | Vandersall | 252/603 |
| 5,215,679 A | | 6/1993 | Cramm et al. | 252/301.35 |
| 5,294,664 A | | 3/1994 | Morrison, Jr. et al. | 524/560 |
| 6,162,375 A | | 12/2000 | Crouch et al. | 252/603 |

FOREIGN PATENT DOCUMENTS

WO          93/22000          11/1993

OTHER PUBLICATIONS

Patton, Temple C., Pigment Handbook, vol. 1, Properties and Economics, pp. 323–347.
George, C.W., et al. "Evaluation of Megatard 2700 A Proposed New Fire Retardant System", Intermountain Forest and Range Experimental Station, General Technical Report INT–112 (Aug. 1981).
English language abstract of Artsybashev, E.A., et al., Lesnoe Khozyaistvo, No. 12, pp. 43–44 (1991).
English language abstract of Artsybashev, E.S., et al., Lesnoe Khozyaistvo, No. 6, pp. 40–42 (1988).
English language abstract of Lorberbaum, V.G., et al, Lesnoe Khozyaistvo, No. 9, pp. 59–60 (1983).
Abstract of Chemical Week, (Mar. 28, 1979), p. 40.
English language abstract of Shchetinskii, E.A., et al., Lesnoe Khozyaistvo, No. 5, p. 88 (1975).
Derwent Abstract WPI No. 73–76319U of FR 2172867 (1973).
Derwent Abstract WPI No. 95–198325 of RU 2022630 (1995).
Derwent Abstract WPI No. 91–013531 of SU 1544451 (1991).
Derwent Abstract WPI No. 91–013530[02] of SU 1544450 (1991).
Derwent Abstract WPI No. 86–055675 of AU 8544579 (1986).
Derwent Abstract WPI No. 80–77100C of BE 883892 (1980).

* cited by examiner

*Primary Examiner*—Matthew A. Thexton
(74) *Attorney, Agent, or Firm*—Thompson Coburn LLP; Kenneth Solomon

(57) ABSTRACT

Colorized fire retardants, and methods of making and using the same, are provided that include an uncolored or minimally colored fire retardant composition and a colorant. The colorant is an aqueous dispersion, slurry, or suspension that includes an insoluble, non-fugitive pigment, e.g., red iron oxide or titanium dioxide. The aqueous dispersion pigment is added to the uncolored or minimally colored fire retardant composition at a time proximate to discharging the retardant onto the fuel. Accordingly, a user has control over the type and amount of colorant added to the fire retardant composition.

13 Claims, No Drawings

COLORANT LIQUID, METHOD OF USE, AND WILDLAND FIRE RETARDANT LIQUIDS CONTAINING SAME

CROSS-REFERENCE TO RELATED APPLICATIONS

This is a continuation-in-part of U.S. patent application Ser. No. 09/261,497, filed Mar. 3, 1999, now U.S. Pat. No. 6,447,697.

STATEMENT REGARDING FEDERALLY SPONSORED RESEARCH OR DEVELOPMENT

Not Applicable.

FIELD OF THE INVENTION

The present invention is directed to aqueous fire retardant compositions, and methods of making and using the same, containing dispersed, slurried, or suspended colorants. In particular, the present invention is directed to aqueous fire retardant compositions containing dispersed, slurried or suspended colorants comprised of insoluble, non-fugitive pigments.

BACKGROUND

A variety of fire retardant solutions are known. "Evaluation of Megatard 2700: A Proposed New Fire Retardant System", C. W. George and C. W. Johnson, U.S.D.A. Forest Service, Intermountain Forest and Range Experimental Station, General Technical Report INT-112, August 1981, which is hereby incorporated by reference in its entirety, describes a fire retardant system containing ammonium sulfate as the active fire retardant salt, a guar gum thickener, iron oxide as a colorant, a spoilage inhibitor, and corrosion inhibitors. In this case, the fire retardant composition is prepared by mixing ammonium sulfate and corrosion inhibitor to form a liquid component. The iron oxide, thickener, and spoilage inhibitor are mixed with water to form a slurry. The slurry and the liquid component are then mixed in equal volumes to form the mixed fire retardant, which is then loaded into an aircraft or ground engine, transported to, and applied to retard a wildland fire.

It is conventional practice to add the components of a fire retardant solution, as a preformed concentrate, into water at a prescribed mix (dilution) ratio in order to form the fire retardant solution. There are conventionally three types of fire retardant concentrates: "dry-powder" concentrates, "fluid" concentrates, and "liquid" concentrates.

"Dry-powder" type concentrates are simply dry mixtures of components that are mixed into water in order to form a fire retardant solution.

The "fluid concentrate" type fire retardants, which are low viscosity, are delivered to mixing or dilution locations, or depots as low viscosity, concentrated fluids or slurries. When the fluid concentrates are subsequently diluted with water, at their prescribed mix ratios, suspended thickeners are activated and gum-thickened fire retardant solutions are prepared. The level of viscosity obtained upon dilution of the fluid concentrate can be altered by varying the amount of gum-thickener incorporated in the formulation. Fluid concentrate type fire retardants are generally mixed with water at the time of use, directly into the application vehicle. Low viscosity fluid concentrates are formed in accordance with the teachings of U.S. Pat. Nos. 4,839,065, 4,971,728 and 4,983,326, which are hereby incorporated by reference in their entireties.

A third type of wildland fire retardant concentrate, referred to as a "liquid concentrate," is delivered to mixing or dilution locations, or depots as a high viscosity suspension. When the liquid concentrates are subsequently diluted with water, at their prescribed mix ratios, low viscosity fire retardant solutions are obtained. These solutions are formed by dilution prior to use in order to prevent separation and settling of the solids from the liquid. Liquid concentrates are prepared in accordance with the teachings of U.S. Pat. Nos. 3,730,890 and 3,960,735, which are hereby incorporated by reference in their entireties.

Although both "fluid" and "liquid" type concentrates are fluid or liquid mixtures, the terms have a particular meaning in the art. A fluid concentrate exhibits a low viscosity until diluted with water. At that time, suspended thickeners are activated and the viscosity of the resultant solution remains unaffected, or increases, depending on the amount of thickener in the concentrated composition. A liquid concentrate, on the other hand, is a relatively high viscosity liquid mixture containing suspended clay, and optionally, other components that, upon dilution at the prescribed mix ratio, forms an unthickened fire retardant solution with a reduced viscosity relative to the concentrate form that is prepared. Accordingly, the terms "liquid" and "fluid" when used in the phrases "liquid concentrate" and "fluid concentrate," have a specific meaning. When the terms "liquid" and "fluid" are used elsewhere, they are intended to have their common meaning—referring to the physical phase of matter that conforms to a volume and that is substantially incompressible. Although, as described previously, the terms "liquid" and "fluid" include mixtures of liquids with undissolved solid particles.

Fire retardant solutions used to combat and control wildland fires are applied from the ground or from the air. Application from the ground is usually from a vehicle such as a fire engine, while application from the air is usually from an airplane or helicopter. It is often desirable to mark the locations where fire retardants have been applied in order to coordinate fire-fighting activities, conserve supplies, and show the progress of the fire-fighting effort. Therefore, color pigments are often added to the fire fighting product at the time of the product's manufacture.

The fuel that feeds a wildland fire varies widely from grasses to large trees. Therefore, the color pigment in the applied fire retardant must present an adequate color contrast from the background fuel to conveniently show where fire retardant has been applied. The pigmented fire retardants of the prior art, however, might contain too much or too little colorant for a particular application because, while the color and geometry of wildland fuels vary widely, the concentration of pigment is fixed at the time of fire retardant manufacture at the factory.

Accordingly, it would be desirable to have the capability of adjusting the colorant level in the fire retardant solution at the time of use relative to the amount needed to maintain visibility. This ability would both minimize the possibility of leaving unobserved discontinuities in the retardant fire break through which a fire could escape, and minimize the use of colorant in those instances when visibility is easily achieved. Either case would result in savings in cost and possibly property.

SUMMARY OF THE INVENTION

In overcoming many of the above disadvantages, a colorized fire retardant composition is provided. In a first aspect of the invention, a colorized fire retardant is provided that comprises an uncolored, or minimally colored fire retardant composition and a colorant in an amount effective to colorize the uncolored fire retardant composition. The colorant of the invention is an aqueous dispersion of a non-fugitive pigment, wherein the aqueous dispersion is a slurry or a suspension, and wherein the pigment is insoluble and has an average particle diameter less than about 1 micrometer.

In a second aspect of the invention, a method of forming a colorized fire retardant is provided that includes adding an aqueous dispersion of a non-fugitive pigment to an uncolored, or minimally colored fire retardant composition in an amount effective to colorize the uncolored fire retardant composition, wherein the pigment is insoluble, the aqueous dispersion is a slurry or suspension, and the aqueous dispersion is added at a time proximate to transporting and discharging the colorized fire retardant composition to a fuel.

In a third aspect of the invention, a method of optically marking fuel is provided that comprises adding an aqueous dispersion of non-fugitive pigments to an uncolored fire retardant composition in an amount effective to colorized the uncolored fire retardant composition, wherein the pigments have an average particle diameter less than about one micrometer, and the aqueous dispersion is a suspension or a slurry that is added at a time proximate to discharging the colorized fire retardant composition to a fuel at a rate effective to colorize the uncolored fire retardant solution. The method further includes discharging the colorized fire retardant solution to form a discharge, directing the discharge to mark the fuel, monitoring a parameter, and adjusting the rate that the pigment is added responsively to the monitored parameter.

BRIEF DESCRIPTION OF THE DRAWINGS

Not applicable.

DETAILED DESCRIPTION OF THE INVENTION

The fire retardant compositions of the present invention include an uncolored or minimally colored fire retardant composition and a colorant that, in combination, form a colorized fire retardant composition. As used herein, the term "uncolored" includes both minimally uncolored and truly uncolored. Accordingly, "uncolored fire retardant compositions" include minimally colored fire retardant compositions. The uncolored fire retardant compositions of the invention can also be solutions, mixtures, emulsions, or suspensions. The colorant of the invention is present in an amount effective to colorize the uncolored fire retardant composition, and includes an aqueous dispersion of an insoluble, non-fugitive pigment. The aqueous dispersion is a slurry or a suspension. As used herein, the term "aqueous" means made of, by, or including water. As such, an aqueous solution may contain other solvents, such as alcohol and/or glycol.

Although the term "fire retardant solution" is used herein, it is understood that such fire retardant liquid mixtures are not true solutions in which all of the components are dissolved to form a single homogenous liquid phase without solid phases or other immiscible liquid phases present. It will be recognized that some of the components used may be essentially insoluble in the liquid components. That is, components such as iron oxide and titanium oxide are insoluble in water. Nonetheless, the term "solution" will be used as well as the more physicochemically correct terms such as "fluid" or "liquid" because the term is commonly used in this art. Thus, the term "fire retardant solution" is used to mean the fire retardant composition formed by water and other liquid and/or solid components ready for application onto burning fuels.

The pigments of the invention have properties effective to allow them to be dispersed in water to form the aqueous pigment dispersion and to cause the aqueous pigment dispersion to remain stable, resisting sedimentation without agitation, until the dispersion is used to form colorized fire retardant liquids. The term "pigment" as used herein, means colorizing compounds that are insoluble in the media in which they are used, and, consequently are present as solid particles. The terms "dispersion" and "suspension" as used herein mean solid/liquid mixtures in which the solid does not readily separate out from the liquid prior to the use of the dispersion or suspension, even in the absence of agitation or some other energy being imparted to the dispersion. The liquid can include some dissolved solids, but generally includes only liquids containing insoluble solids. The term "slurry" as used herein means a solid/liquid mixture in which the solid separates out from the liquid in the absence of agitation or some other energy being imparted to the mixture. It is understood by one of ordinary skill in the art that, other parameters being equal, slurries are formed by larger sized particles than the smaller sized particles that form dispersions or suspensions.

The colorant of the invention is comprised of a non-fugitive pigment. The non-fugitive pigment is one that is insoluble in a carrier liquid, and which, if colored, does not necessarily fade after aerial application of the fire retardant composition. The non-fugitive pigment is dispersible in the slurry or suspended colorant of the invention. Any non-fugitive pigment can be employed in the compositions of the invention. Suitable non-fugitive pigments include, but are not limited to iron oxides, including red and yellow iron oxide, as well as titanium dioxide, a white pigment, antimony oxide, potassium titanate, ferrite, and iron cyanide blue. Other suitable non-fugitive pigments are found in Pigment Handbook, Volume 1, Properties and Economics, edited by Temple C. Patton, which is hereby incorporated by reference in its entirety. The same can be used as opacifying agents in accordance with the invention. Opacity is defined as the ability of matter to obstruct the transmission of radiant energy or light. Accordingly, non-fugitive pigments, which do not fade upon exposure to light, may also be useful as opacifying agents. In a specific embodiment of the invention, red iron oxide is employed as the non-fugitive pigment. In another specific embodiment of the invention, titanium dioxide is the non-fugitive pigment of the invention. Combinations of non-fugitive pigments are employed in yet another embodiment of the invention.

Aqueous pigment dispersion colorants, being already dispersed, are more easily dispersed in a fire retardant solution than are dry-powder pigment colorants. Without being bound by theory, this difference in the ease of dispersion is believed to result from the fact that the pigment particles are present in the aqueous pigment dispersions as individual, discrete and separate particles whereas the dry-powder pigments tend to exist in the dry state as agglomerates. Such agglomerates require considerable energy input to achieve the same degree of ultimate dispersion as the pre-dispersed pigments in the aqueous pigment dispersions.

Accordingly, the colorant component of the present invention, which are aqueously suspended or slurried pigments, can be advantageously added directly to a neat fire retardant solution, in order to form the colorized fire retardant solution of the present invention, at any time before applying the colorized fire retardant solution to a fire or to fuel threatened by a fire. It is particularly advantageous to add the aqueously slurried or suspended colorant shortly before the thus formed colorized fire retardant solution is used, such as at the time that the delivery (or application) vehicle is being loaded with the fire retardant solution, or just before, or as the colorized fire retardant is discharged to the fuel.

The colorized fire retardant solutions of the present invention are sufficiently stable from settling or separation of the dispersed pigment from the liquid so that the colorized fire retardant solutions can be mixed ahead of the time of use. In particular, the viscosity stability during storage may be improved when the aqueous pigment dispersion is present.

The present invention, as described above, utilizes insoluble, non-fugitive pigment particles that are dispersed in an aqueous medium as a slurry, suspension, or dispersion. The suspended colorant is of a particle size effective to maintain the dispersion of the pigment particles, with little or no agitation, prior to use of the dispersion. By contrast, agitation is required when pigment slurries of the invention are used, without which the solid particles would settle out from the liquid prior to using the slurry. The average particle size of the insoluble, non-fugitive particles used to form the aqueous pigment dispersion colorant of the invention is less than about 10 micro-meters ($\mu$m), preferably less than about 5 $\mu$m, and more preferably less than about 1 $\mu$m. The smaller size particles are more effective at remaining dispersed or suspended in an aqueous medium, e.g. water, without settling, when agitation or other energy is not imparted.

In one embodiment, the average particle size is in the range of about 0.35 $\mu$m to about 0.55 $\mu$m. In another embodiment, the average particle size is in the range of about 0.35 $\mu$m to about 0.45 $\mu$m. As stated above, small particle size distribution causes the slurry, dispersion, or suspension to be better dispersed or suspended in the aqueous carrier.

As will be readily understood by one skilled in the art, the pigments used in the aqueous pigment dispersion colorant of this invention can be produced by any convenient method known to produce small particles that will remain in a dispersion, slurry, or suspension. For example, solid pigments can be ground to form appropriately sized particles.

It is important that the pigments of the invention remain dispersed as a dispersion, slurry, or suspension. Accordingly, constituents that cause agglomeration should not be included. For example, the presence of attapulgus clay in some fire retardant solutions leads to the agglomeration of some pigment dispersions. It is understood that it is the agglomeration that should be avoided rather than any particular ingredient. Thus, any potential agglomerating ingredient should be counteracted by any convenient effective dispersing ingredient such as, for example, a dispersing agent or a surfactant.

The colorant of the invention can include opacifiers (hiding agents) such as, for example, potassium titanate, zinc oxide, zinc sulfide, lead salts, antimony oxide, earth-tone colored iron oxides, iron phosphates and the like, and selected extender or filler pigments such as non-reactive clays, calcium sulfate and mixtures thereof at a level effective to provide a desired amount of opacity. Such components can be incorporated by any convenient method. The opacifier can be any hiding pigment or any filler powder that (i) is insoluble and non-reactive in the fire retardant solution and (ii) becomes acceptably inconspicuous after the application of the fire retardant solution. It is preferred that the opacifier is able to opacify or hide the substrate without causing significant abnormal colors relative to the applied environment. Thus, for applications to forest fires, an earth tone would be desirable as a background color to which the colorized liquid fades. Such earth tones can be formed by using brown iron oxide with a white pigment to lighten the brown color as desired to blend with the background color of the area of dispersal as the fugitive color fades. Such components may also be conveniently included in the uncolored fire retardant compositions.

One embodiment of the present invention is directed to forming a colorized fire retardant composition from an uncolored fire retardant composition. The method comprises adding the above-described colorants of the invention, which are aqueous dispersions of insoluble, non-fugitive pigments to the uncolored fire retardant solution in an amount effective to colorize the uncolored fire retardant composition. The colorant is added at a time proximate to discharging the colorized fire retardant composition to a fuel.

The method can include monitoring at least one parameter and adjusting the amount of aqueous pigment dispersion incrementally in response to the monitored parameter. The parameter monitored can be any conveniently measured property such as the color or reflectance of the fuel, color of the colorized fire retardant solution, wind conditions, ambient temperature, or the temperature or smoking character of the fire. The amount of aqueous pigment dispersion can be added incrementally, at a rate effective to colorize the uncolored fire retardant solution, as the colorized fire retardant solution is loaded onto the applying vehicle or, possibly, as it is discharged onto the target fuel. The rate can be adjusted in response to the monitored parameter.

Another embodiment of the present invention is directed to optically marking fuel. The method comprises adding the above-described colorants of the invention to uncolored fire retardant solutions at a rate effective to colorize the uncolored fire retardant solutions; discharging the colorized fire retardant solutions to form a discharge; directing the discharge to mark the fuel; monitoring at least one, above-described parameter; and adjusting the rate that the pigment is added responsively to the monitored parameter.

The color properties of the fire retardant compositions of the present invention increase with applied film thickness. The opacity, transmitted color intensity of the wet film, and reflected color intensity of the dry film increase with coverage level. The fire retardant compositions of the invention provide effective visibility at the coverage levels typically required in the field. For example, fire retardant coverage levels of the present invention are in the range of about 2 gpc to about 4 gpc (gallons per hundred square feet). The following examples illustrate specific embodiments of the invention without limiting the scope of the invention in any way.

EXAMPLES

Examples 1–8, Comparative Examples C1–C5, and Comparative Examples OpC1–OpC6—Four Aqueous Pigment Dispersion Colorants Nineteen examples of fire retardant solutions were made. The base uncolored fire retardant concentrate was PHOS-CHEK® D-75, an uncolorized form of colorized PHOS-CHEK® D-75R or D-75F, made by Monsanto Company (St. Louis, Mo.). PHOS-CHEK® D-75R is PHOS-CHEK® D-75 with red iron oxide added. PHOS-CHEK® D-75F is PHOS-CHEK® D-75 with a fugitive colorant added. The color pigments and opacifiers used in these samples are described in Table 1 below:

TABLE 1

| | |
|---|---|
| STD | Standard dry powder conventional fugitive pigment containing a light sensitive dye and an opacifier in a polymer matrix, manufactured by Radiant Color Corporation (Richmond, California). |
| PMT1 | Fugitive pigment, conventional dry powder type, containing a light sensitive laked dye and an opacifier in a polymer matrix, prepared by Radiant Color Corp. |
| PINK | Aqueous pigment dispersion, Aurora Pink Glo-Sperse Pigment Suspension from Day-Glo Color Corporation (Cleveland, Ohio). |
| RED | Aqueous pigment dispersion, Rocket Red Glo-Sperse Pigment Suspension from Day-Glo Color Corp. |
| ORANGE | Aqueous pigment dispersion, Blaze Orange Glo-Sperse Pigment Suspension from Day-Glo Color Corp. |
| CRIMSON | Aqueous pigment dispersion, Crimson Splash Emulsified Pigment Suspension from Day-Glo Color Corp. |
| Micro-1 | Microspherical conventional dry powder pigment manufactured by Radiant Color Corp. |
| Micro-STD | Microspherical dry powder pigment containing same dye as that in STD, manufactured by Radiant Color Corp |
| $TiO_2$ | Pigment grade titanium dioxide. |
| $Fe_2O_3$ | Red pigment grade iron oxide |

The nineteen examples included uncolored, fugitive-colored, opacified fugitive-colored, and a non-fugitive-colored example. Examples 1–4 are non-opacified examples of the present invention utilizing the CRIMSON, PINK, RED, and ORANGE pigments, respectively. Examples 5–8 are opacified examples of the present invention utilizing the CRIMSON, PINK, RED, and ORANGE pigments, respectively. Comparative Examples C1–C4 contain different dry-powder type fugitive pigments in a non-opacified retardant solution for comparison utilizing the STD, PMT1, Micro-1, and Micro-STD pigments, respectively. Comparative Example CS is a non-opacified, non-fugitive-colored example. Comparative Examples OpC1–OpC4 are opacified examples for comparison utilizing the STD, PMT1, Micro-1, and Micro-STD dry-powder type pigments, respectively, and can be considered opacified examples of the respective Comparative Examples CI–C4. Finally, Comparative Examples OpC5 and OpC6 are opacified non-fugitive-colored examples for comparison. The characteristics of the nineteen examples are summarized in Table 2 below:

TABLE 2

| | Opacified | Fugitive-Colored | Aqueous Emulsion or Suspension |
|---|---|---|---|
| Examples 1–4 | NO | YES | YES |
| Examples 5–8 | YES | YES | YES |
| Comparative Examples CI-C4 | NO | YES | NO |
| Comparative Examples OpCI-OpC4 | YES | YES | NO |
| Comparative Example C5 | NO | NO | NO |
| Comparative Examples OpC5 and OpC6 | YES | NO | NO |

In one study, the compositions described in Table 2 were prepared by adding the fugitive color pigment (both the dry powder and the aqueous pigment dispersions) to the uncolorized PHOS-CHEK® D-75 dry-powder concentrate. The resulting colorized dry-powder concentrates were then admixed with water to prepare the respective fire retardant solutions of each example. In a second study, the fugitive color pigments were added to the uncolorized PHOS-CHEK® D-75 fire retardant solution after the uncolored dry-powder retardant had been dissolved in water at its recommended mix ratio.

Example 1 was formulated using an emulsified liquid, composed of a dyed copolymer in an aqueous media. The emulsified liquid was Crimson Splash Color ("CRIMSON"), made by Day-Glo Color Corp., Cleveland, Ohio, which had a specific gravity of 1.06 (equivalent to 8.8 pounds per gallon) and contained approximately 45% solids content and a volatile content of about 55%. The emulsion was made by polymerization of a mixture of an acrylonitrile-styrene hydroxypropyl-methacrylate monomers and a dye in an aqueous media. The emulsion can be formed by any convenient method such as, for example, the methods U.S. Pat. Nos. 5,294,664 and 5,215,679, which are hereby incorporated by reference in their entireties. Sodium tridecyl ether sulfate was added to the media to stabilize the suspension stability. The resultant polymer particles were spherical in shape and had a mean diameter in the range of from about 0.35 μm to about 0.40 μm. The surface area of the particles was about 13 to about 15 square meters per gram. No opacifiers were added.

Example 2 used Glo-Sperse Aurora Pink ("PINK"), a dyed copolymer in an aqueous media made by Day-Glo Color Corp. The dyed copolymer dispersion had similar properties as those of Example 1, i.e., about 8.8 pounds per gallon and about 45% active pigment concentration. No surfactant was used in addition to the PINK aqueous dispersion. The polymer particle mean diameter size was in the range of about 0.45 to about 0.55 microns, resulting in a lower surface area from the particles used in the dispersion of Example 1.

Example 3 used Glo-Sperse Rocket Red Polymer ("RED"), a dyed copolymer in an aqueous media made by Day-Glo Color Corp. The dyed copolymer dispersion had similar properties as those of the dispersion used in Example 2. Glo-Sperse Rocket Red Polymer contained 0.48% C.I. Basic Red 1 dye together with unspecified amounts of Potomac Yellow (CAS No. 80100023-5009-P) and Sierra Yellow (CAS No. 80100023-5018-P).

Example 4 used Glo-Sperse Blaze Orange Polymer ("ORANGE"), a dyed copolymer in an aqueous media made by Day-Glo Color Corp. Example 4 differs from Example 3 by having only 0.28% C.I. Basic Red 1 dye.

Examples 1–4 are similar, differing only in the types and amounts of dyes and surfactants that are contained in their compositions and small differences in physical characteristics, such as average particle diameter and surface area. The colors of the aqueous pigment dispersions included in these Examples can be described as follows: Example 1 exhibited a high intensity crimson color, Example 2 exhibited a considerably lighter pink color, Example 3 exhibited a red color having an intensity greater than that of Example 2, but less intense than Example 1, and Example 4 exhibited a color similar to International orange. The colors can be characterized according to values of the parameters "L," "a," and "b," which are described in greater detail below. The data for "L" values is shown below in Table 9, the "a" value data is shown below in Table 10, and the "b" value data is shown below in Table 11.

In each of the examples, all of the dry-powder components of the uncolored fire retardant concentrate were first admixed together while still dry, and then mixed with rapid agitation, with room temperature water, at a ratio of 1.2 pounds per gallon of water (0.144 grams per milliliter). The gum thickener component of the concentrate causes the viscosity of the solution to increase shortly after wetting occurs, and forms the base uncolored fire retardant solution. When a dry-powder pigment was incorporated into the Comparative Example formulations, it was added to the other dry-powder fire retardant components prior to mixing to form the fire retardant solution. On the other hand, when an aqueous pigment dispersion of the present invention was incorporated into the Example formulations, the uncolorized fire retardant solution was prepared as illustrated in Table 3a below, and the aqueous pigment dispersion was mixed therein.

TABLE 3a

|  | Ex. 1 ppw | Ex. 2 ppw | Ex. 3 ppw | Ex. 4 ppw |
|---|---|---|---|---|
| Uncolored Concentrate | 111.8 | 111.8 | 111.8 | 1111.7 |
| FUGITIVE COLOR | | | | |
| CRIMSON | 3.221 | | | |
| PINK | | 3.221 | | |
| RED | | | 3.221 | |
| ORANGE | | | | 3.278 |
| TOTAL | 115.048 | 115.048 | 115.048 | 115.048 |

The viscosities of the resultant colorized fire retardant solution examples were measured 10 minutes after beginning the final mixing procedure, and after 32 days of ambient temperature storage. The measured viscosity data is shown in Table 3b below.

TABLE 3b

|  | Ex. 1 | Ex. 2 | Ex. 3 | Ex. 4 |
|---|---|---|---|---|
| wt% Fugitive pigment | | | | |
| Aqueous Pigment Dispersion | 45.0 | 45.0 | 44.34 | 44.36 |
| Fire Retardant Concentrate | 1.26 | 1.26 | 1.24 | 1.26 |
| SOLUTION VISCOSITY (cps) | | | | |
| 10 Min after mixing | 1633 | 1633 | 1673 | 1613 |
| 32 Days after mixing | 1553 | 1597 | 1607 | 1580 |
| Δ change | 80 | 66 | 66 | 33 |

Table 3b illustrates that the fugitive pigment content of Examples 1–4 are essentially identical.

The concentration of fugitive pigment in the fire retardant is calculated on the basis of the wt % present in the dry retardant concentrate and not on the total solution. As an example of the various wt % relationships, 25 pounds (11.37 kg) of standard fugitive color blended into 2000 pounds (909.8 kg) of fire retardant concentrate leads to a concentration of 1.25 k of the color in the resulting dry powder. Then, for example, 1.2 pounds (544.32 g) of the dry powder which contains 0.015 pounds (6.8 g) of fugitive pigment, can be mixed with a gallon (8.32 lb. or 3.785 kg) of water to produce the solution. The resulting solution would contain 0.0157% pigment solids (6.8/(3785+544.32)).

Examples 5–8 are opacified examples made similarly to Examples 1–4 except that 1.15 ppw (parts per weight) of $TiO_2$ and 0.29 ppw of $Fe_2O_3$ were added to each formulation of Examples 1–4 for opacification. The opacifiers were added as dry powders to the other dry-powder components of the uncolored fire retardant concentrate and admixed together while still dry. The dry mixture was then mixed with rapid agitation, with room temperature water, and the process continued as described in Examples 1–4. The compositions of Examples 5–8, in parts per weight, and the measured viscosity data for each Example are shown in Table 4 below.

TABLE 4

|  | Ex. 5 ppw | Ex. 6 ppw | Ex. 7 ppw | Ex. 8 ppw |
|---|---|---|---|---|
| Uncolored Concentrate | 110.0 | 110.0 | 109.9 | 109.9 |
| FUGITIVE COLOR | | | | |
| CRIMSON | 3.566 | | | |
| PINK | | 3.566 | | |
| RED | | | 3.624 | |
| ORANGE | | | | 3.624 |
| OPACIFIER | | | | |
| $TiO_2$ | 1.150 | 1.150 | 1.150 | 1.150 |
| $Fe_2O_3$ | 0.288 | 0.288 | 0.288 | 0.288 |
| TOTAL | 115.048 | 115.048 | 115.048 | 115.048 |
| % Fugitive Pigment in | | | | |
| Aqueous Pigment Dispersion | 45.00 | 45.00 | 44.34 | 44.16 |
| Fire Retardant Concentrate | 1.26 | 1.26 | 1.24 | 1.26 |
| % Opacifiers in Fire Retardant Concentrate | 0.14 | 0.14 | 0.16 | 0.13 |
| SOLUTION VISCOSITY (cps) | | | | |
| 10 Min after mixing | 1630 | 1673 | 1667 | 1630 |
| 32 Days after mixing | 1550 | 1633 | 1600 | 1543 |
| Δ change | 80 | 40 | 67 | 67 |

Comparative Examples C1–C4 used conventional dry powder pigments as the fugitive colorants. These pigments were added to the uncolored base concentrate at the calculated concentration, which resulted in a nominal pigment concentration in the dry powder component of 1.26%.

In each of the Comparative examples, all the dry-powder components (including the uncolored fire retardant concentrate and dry-color pigments) were first admixed together while still dry. This dry blend was then mixed with rapid agitation, with room temperature water, at a ratio of 1.2 pounds per gallon of water (0.144 grams per milliliter).

As described above for the Examples, the viscosity was measured at different time intervals. The compositions of Comparative Examples C1–C4, in parts per weight (ppw), and the viscosity data are shown in Table 5 below.

TABLE 5

|  | Comp. Ex. C1 ppw | Comp. Ex. C2 ppw | Comp. Ex. C3 ppw | Comp. Ex. C4 ppw |
|---|---|---|---|---|
| Uncolored Concentrate | 113.6 | 113.6 | 113.6 | 113.6 |
| FUGITIVE COLOR | | | | |
| STD | 1.438 | | | |
| PMT1 | | 1.438 | | |
| Micro-STD | | | 1.438 | |
| Micro-1 | | | | 1.438 |
| TOTAL | 115.048 | 115.048 | 115.048 | 115.048 |
| % Fugitive Pigment in | | | | |
| Dry-Powder Pigment | 100.00 | 100.00 | 100.00 | 100.00 |
| Fire Retardant Concentrate | 1.25 | 1.25 | 1.25 | 1.25 |
| SOLUTION VISCOSITY (cps) | | | | |
| 10 Min after mixing | 1747 | 1743 | 1727 | 1633 |
| 32 Days after mixing | 1580 | 1507 | 1533 | — |
| Δ change | 167 | 236 | 194 | — |

Comparative Example C1 used a standard dry-powder type fugitive color pigment ("STD") was made by Radiant Color. The pigment is characterized as incorporating a red dye similar to C.I. Solvent Red, and approximately 5 wt % of an opacifier such as titanium dioxide in a polymer by a static-bed polymerization process. After cooling, the glass-like mass was pulverized to a median particle size of about 5 to 10 microns and exhibited a Hegman grind gauge measurement in the range of 5.0 to 5.5. The surface area of the pigment was estimated to be about 0.5 square meters per gram.

Comparative Example C2 was made by a process similar to that of Comparative Example C1, except that a barium laked Red 2B dye was incorporated in the dry-powder pigment ("PMT1") during manufacture in place of the standard dye of Comparative Example C1. The dry-powder pigment PMT1 was made by a process similar to that used to make the standard dry powder pigment STD. The particle size and surface area of PMT1 was similar to the STD standard dry-powder fugitive pigment.

Comparative Examples C3 and C4 were mixed similarly to Comparative Example C1. The dry-powder fugitive pigment included in Comparative Examples C3 and C4 were pigments described by the manufacturer as microspherical having particle sizes in the range of about 0.5 to 2.0 microns. The pigments differed from each other in that the dye that was incorporated in the pigment. The microspherical pigment ("Micro-1") used in Comparative Example C4 used a different dye from Comparative Example C1, while Comparative Example C3 used a microspherical pigment ("Micro-STD") that incorporated the same dye that was in the STD standard dry powder pigment of Comparative Example C1.

Comparative Examples OpC1–OpC4 were the respective Comparative Examples C1–C4 opacified with an additional 1.3 ppw (1.0 wt %) titanium dioxide and 0.3 ppw (0.25 wt %) red iron oxide ($Fe_2O_3$). The opacifiers were added as dry powders to the other dry-powder components of the base uncolored fire retardant composition, admixed, and added to water under agitation as described above.

Viscosity measurements were performed similarly as described above. The compositions of Comparative Examples OpCI–OpC4, in parts per weight (ppw), and the viscosity data are shown in Table 6 below.

TABLE 6

|  | Comp. Ex. C1 Ppw | Comp. Ex. C2 ppw | Comp. Ex. C3 ppw | Comp. Ex. C4 ppw |
|---|---|---|---|---|
| Uncolored Concentrate | 112.0 | 112.0 | 112.0 | 112.0 |
| FUGITIVE COLOR | | | | |
| STD | 1.611 | | | |
| PMT1 | | 1.611 | | |
| Micro- STD | | | 1.611 | |
| Micro-i | | | | 1.611 |
| OPACIFIER | | | | |
| $TiO_2$ | 1.150 | 1.150 | 1.150 | 1.150 |
| $Fe_2O_3$ | 0.288 | 0.288 | 0.288 | 0.288 |
| TOTAL | 115.049 | 115.049 | 115.049 | 115.049 |
| % Fugitive Pigment in | | | | |
| Dry-Powder Pigment | 100.00 | 100.00 | 100.00 | 100.00 |
| Fire Retardant Concentrate | 1.26 | 1.26 | 1.24 | 1.24 |
| SOLUTION VISCOSITY (cps) | | | | |
| 10 Min after mixing | 1743 | 1693 | 1703 | 1580 |
| 32 Days after mixing | 1543 | 1533 | 1567 | — |
| Δ change | 200 | 160 | 136 | — |

Comparative Example C5 was the standard uncolorized fluid and contained neither a fugitive pigment nor an opacifying component. Comparative Example OpC5 was an opacified version of Comparative Example CS, and contained 1.0 wt % titanium dioxide and 0.25 wt % red iron oxide. Comparative Example OpC6 is an example of a fire retardant concentrate that has a non-fugitive ("persistent") color. Comparative Example OpC6 contained 1.0 wt % of the persistent red iron oxide in the fire retardant concentrate. In each case, the mixing procedure was similar to that described above.

Similarly, viscosity measurements were made as described above. The compositions of Comparative Examples C5, OpC5, and OpC6 and the viscosity data are shown in Table 7 below:

TABLE 7

|  | Comp. Ex. C5 ppw | Comp. Ex. OpC5 ppw | Comp. Ex. OpC6 ppw |
|---|---|---|---|
| Uncolored Concentrate | 113.6 | 112.0 | 49.8 |
| OPACIFIER | | | |
| $TiO_2$ | — | 1.150 | — |
| $Fe_2O_3$ | — | 0.288 | 0.503 |
| TOTAL | 113.610 | 113.438 | 50.331 |
| % Fugitive Pigment In | | | |
| Dry Powder Pigment | 0.00 | 0.00 | 0.00 |
| Fire Retardant Concentrate | 0.00 | 0.00 | 0.00 |
| % Opacifiers and Persistent Color in Fire Retardant Concentrate | 0.00 | 0.14 | 1.00 |
| SOLUTION VISCOSITY (cps) | | | |
| 10 Min after mixing | 1617 | 1623 | 1700 |
| 32 Days after mixing | — | — | — |
| Δ change | — | — | — |

The color and hiding ability (opacity) of each of the fire retardant solutions, prepared as described above, were characterized and compared using 4.0 inch wide films having a wet thickness of 0.032 inch that were drawn with an adjustable gap doctor blade on a standard glass plate. The films were allowed to dry for 20 minutes in a horizontal position prior to testing. The wet film thickness of 0.032 inch was equivalent to a fire retardant solution application rate in practice of 2 gpc (0.7 L/M$^2$).

Light transmission through the fire retardant film for each formulation was measured on a HunterLab Ultrascan spectrocolorimeter. The measurements were made by Atlas Weathering Service Group's DSET Laboratories located at New River, Ariz. The Hunter Lab instrument had a six inch integrating sphere. Total transmittance was measured in accordance with ASTM D2244-93 and ASTM E308-95 standards with a 100 observer and a D65 illuminant. The specimen port was circular and 1.00 inch in diameter with an 80° viewing angle and a beam diameter of 0.73 inch. Data reduction was computed from spectral data (X, Y and Z data points) taken every 10 nm over the wavelength range from 375 nm to 700 nm. The percentage of the illuminant light which passed through the film (Y) and its color were obtained on the wet film for each formulation at three times: about 20 and 120 minutes after application, and prior to sunlight exposure the following morning.

The percentage of the illuminant light that passes through the film is directly related to the Y value obtained from the spectrocolorimeter; conversely, 100-Y is equivalent to the degree of opacification of the film. The L, a, and b color values were calculated from the above measurements. The (L) value is a measure of the lightness or darkness of the color, i.e., when L=100 the film is white, and when L-0 the film is black. Thus L=50 would be obtained for a film with equal amounts of black and white, i.e. a grey known in the graphic arts as 50% grey. The a value represents the red/green balance of the color, i.e., when a is positive, more red than green is present and when negative, more green than red is present. The greater the absolute value, the more intense the color. If a=0, neither red nor green is dominant over the other in the overall color. Similarly, the b value represents the yellow/blue balance of the film. When b is positive, the color contains more yellow than blue, when negative, the color contains more blue than yellow. Again, the greater the absolute value, the more intense the color. For example, the color purple would have a high positive a value and a large negative b value, resulting in a perceived combination of red and blue, while a color orange would have a mixture of positive a and positive b values that result in a perceived combination of red and yellow.

The L, a, and b values of light reflected from the test films were measured with a Hunter Lab Labscan spectrocolorimeter with 00/450 geometry in accordance with STM D2244-93 and ASTM E308-90 standards with a 10° observer and D65 illuminant. The incident light was at a 0° angle and the viewing light was 450 relative to the specimen. The specimen port was circular and 1.00 inch in diameter. Data reduction was computed from spectral data taken every 10 nm over the wavelength range from 400 nm to 700 nm. In all cases the glass plate on which the test film was placed was backed with a forest green ceramic tile at the time of measurement. Measurements were made prior to exposure (at 0 Langleys exposure) followed by measurement at 6,000, 12,000 and 18,000 Langleys (2.51, 5.02, and 7.53×10$^8$ J/M$^2$) of natural sunlight exposure. In some cases, measurements were continued at 24,000, 33,000 and 36,000 Langleys (10.04, 13.8, and 15.06×10$^8$ J/M$^2$).

Between light reflectance measurements, the dry films were exposed to natural sunlight near Phoenix, Ariz. The films were exposed in accordance with ASTM G-24-87, Method A, using a tilt angle of 45° from the horizontal. The films were placed under glass to protect them from the effects of debris and rain.

The films on the glass plates faced south with the plates mounted in a cabinet, with passive ventilation, unbacked, in aluminum frames. The mounted plates were removed from the racks and taken indoors for measurement. They were kept indoors in a dark environment during measurement and until a decision was reached as to whether any additional exposure was needed. In most cases, photographs were taken prior to exposure and at each exposure interval after measurements were made. An average of 360 Langleys (0.150×10$^8$ J/M$^2$) per day were accumulated. Accordingly, about 50 days of exposure was required to reach 18,000 Langleys (7.53×10$^8$ J/M$^2$).

The data obtained during this study are presented in Tables 8–11 below. Table 8 illustrates the performance of the various color pigments in a non-opacified film. A non-fugitive colorized formulation, Comparative Example OpC6, containing only 1.0 wt % red iron oxide was exposed in the same manner as the fugitive colorized films to identify differences in color composition, color intensity and fading. Example 5, an opacified example, is also included to show the increased opacity of the opacified Example.

The viscosity data reveal that the Comparative Examples lost in the range of about 7.6 to about 13.4% of their 10 minute viscosity when stored at ambient temperature for one month. The other examples, on the other hand, lost an average of only about 4% (range 2.0 to 5.3%) of their 10 minute viscosity during this same storage period.

Generally, uncolorized fire retardant solutions exhibit lower viscosity stability than the same formulation containing a colorizing pigment. Fugitive-colorized fire retardants are more stable than uncolorized fire retardant solutions, and persistent iron oxide non-fugitive colorized fire retardant solutions are the most stable. It is believed that the color components in a solution alter the spectral properties and the penetration depth of light impinging on the solution, thereby mediating the overall impact of the impinging light on the solution.

The aerial visibility of a fire retardant film is believed to be significantly influenced by the hiding ability of the film—that is, the ability of the film to hide that on which it is placed. The hiding ability is related to the film's opacity. One measure of the hiding ability of a film is determining the percentage of applied light which is transmitted through the fire retardant film. Smaller values indicate less light transmission, which corresponds to increased opacity and better hiding ability.

Film transparency decreases (opacity increases) during drying due to the precipitation of soluble components as the solvent (water) evaporates. The percentage of light transmitted through the non-opacified Examples 1–4, the non-opacified Comparative Examples C1–C5, the Comparative Example red iron oxide formulation OpC6, and the opacified Example 5, were measured and are shown in Table 8 below.

TABLE 8

| | Light transmission (%) | |
|---|---|---|
| | WET | DRY |
| Comparative Example C5 | 85 | 65 |
| Comparative Example C1 | 62 | 45 |

TABLE 8-continued

| | Light transmission (%) | |
|---|---|---|
| | WET | DRY |
| Comparative Example OpC6 | 28 | 22 |
| Comparative Examples C2–C4 | 57–69 | 41–50 |
| Examples 2–4 | 58–60 | 47–52 |
| Example 1 | 43 | 39 |
| Example 5 | 17 | 17 |

The hiding efficiency of a pigment is the difference between the transparency of the fire retardant formulation containing the pigment and one containing no pigment, i.e., Comparative Example C5. This difference is dramatically illustrated by the above data. Comparative Example OpC6 is shown by the above data to block approximately twice as much light as Comparative Example C1, both when wet and when dry.

Examples 2–4 did not show significant improvement over the standard pigment, i.e., Comparative Example C1, in terms of either wet or dry film transparency, i.e., increased opacity. Example 1, however, offered significantly improved wet film opacity and somewhat superior dry film opacity relative to the other non-opacified fugitive pigment-containing formulations (Examples 2–4 and C1–C4). Example 5 illustrates the dramatic improvement possible by the inclusion of opacifiers in the film.

As described above, the L value relates to the lightness or darkness of the film, e.g., black and white have L values of 0 and 100 respectively. Table 9 below shows the L values for the fire retardant films included in these experiments. Both wet and dry measurements were made of the color transmitted through the film. The color of the light reflected from the films was measured only after drying. Comparison should not be made between reflected and transmitted color measurements. Comparison should be made only within a given column or measurement method.

TABLE 9

| | Transmitted Light (%) | | Reflected Light |
|---|---|---|---|
| | Wet | Dry | Dry |
| Comparative Example C5 | 93 | 84 | 59 |
| Comparative Example C1 | 83 | 73 | 49 |
| Comparative Example OpC6 | 61 | 22 | 42 |
| Comparative Examples C2–C4 | 81–87 | 70–76 | 50–55 |
| Examples 2–4 | 81–83 | 74–77 | 54–66 |
| Example 1 | 72 | 69 | 46 |

The 1.0% iron oxide pigment in Comparative Example OpC6 darkens the film significantly more than 1.25 t of any of the fugitive color pigments. It should be pointed out, as described earlier, that the levels of fugitive color pigments are recited as wt % taken back to the powder, without liquid components, in order to make consistent comparisons with the comparative examples that are made from dry powders. The comparison examples cannot form dispersions. Accordingly, as described earlier, the percent of fugitive color pigment in the liquid is not comparable to the k of fugitive color pigment in the dispersion.

Example 1 showed greater increase in film darkening than the other fugitive colorants, although not to the same extent as iron oxide. The desirability of having a light or dark film is dependent on the fuels on which the film solution is being used. Light colors would be expected to be more visible on dark green timber while dark colors would be more visible on light colored fuels such as leaves and grass.

As described above, the a value relates to the relative intensities of red and green. Positive values indicate the dominance of red, negative numbers indicate the dominance of green. Table 10 shows the measured a values for the films. The data shows that uncolorized Comparative Example C5 has a greenish cast which changes to red upon the introduction of pigment.

Several of the fugitive pigments are shown in Table 10 to provide a more intense or brilliant red color than the non-fugitive red iron oxide Comparative Example OpC6. Examples 2–4 appeared to be at least about equivalent to iron oxide in terms of red intensity. Example 1, however, was the best of the formulations. It provided greater red-intensities under both wet and dry conditions.

TABLE 10

| | Transmitted Light (%) | | Reflected Light |
|---|---|---|---|
| | Wet | Dry | Dry |
| Comparative Example C5 | −2 | −2 | −5 |
| Comparative Example C1 | 8 | 12 | 16 |
| Comparative Example OpC6 | 12 | 18 | 25 |
| Comparative Examples C2–C4 | 3–12 | 8–16 | 11–29 |
| Examples 2–4 | 10–16 | 12–20 | 25–29 |
| Example 1 | 21 | 24 | 30 |

As described above, the b value relates to the relative intensities of yellow and blue. Positive values indicate the dominance of yellow, while negative values indicate the dominance of blue. Again, larger absolute numbers indicate higher intensities. Table 11 below shows the b values measured for the tested films.

TABLE 11

| | Transmitted Light (%) | | Reflected Light |
|---|---|---|---|
| | Wet | Dry | Dry |
| Comparative Example C5 | 2 | 7 | 3 |
| Comparative Example C1 | 5 | 12 | 10 |
| Comparative Example OpC6 | 6 | 18 | 25 |
| Comparative Examples C2–C4 | 3 | 8–16 | 11–29 |
| Examples 2–4 | −5 to −20 | 15–20 | 25–29 |
| Example 1 | 2 | 24 | 30 |

As described previously, pigments containing high levels of red visually tend towards orange when the b value is positive, and purple when the b value is negative.

The film of uncolorized Comparative Example C5 darkened (decreasing L value), while changing only slightly in other color properties after exposure to natural sunlight. The fugitive pigment candidates tended to darken somewhat with exposure as well. The red content of the fugitive pigments faded during sunlight exposure. Comparative Example C1 lost essentially all of its red color within 6,000 Langleys ($2.51 \times 10^8$ J/M$^2$) of sunlight. The rate of fading of the red color varied significantly from candidate to candidate.

The opacified films were identical to the non-opacified films except that the increased level of hiding pigment improved their ability to hide the substrate on which they were applied. The composition of these formulations are shown in Tables 4, 6 and 7 above. Titanium dioxide whitens the films. Small concentrations of red iron oxide mixed with the white titanium dioxide resulted in a non-pigmented film being colored somewhere between pink and tan. Slightly higher levels of fugitive pigment were used in the opacified films in order to offset the tendency of the opacifier agents to produce pastels.

With respect to hiding ability, opacified Comparative Example OpC5 film containing no fugitive color transmitted 28% and 25% of the illuminant's light through the wet and dry film respectively. These light transmission values were almost identical to those observed with Comparative Example, OpC6 which was pigmented with red iron-oxide (28% and 22% respectively) only. Accordingly, the opacification was equivalent to iron oxide in terms of hiding ability even without a fugitive pigment component. Comparative Example C5, on the other hand, transmitted 85% and 65% of the transmitted light. Inclusion of the fugitive pigments reduced light transmission even further resulting, in all cases, in hiding abilities superior to red iron oxide. Opacified Example 5 was superior to all the other fugitive pigmented formulations in hiding ability.

With respect to L value, based on light transmission measurements, the opacified, but uncolorized, Comparative Example OpC5 film had light/dark characteristics when wet similar to the equivalent film, Comparative Example OpC6, that contained only the 1.0% red iron without the $TiO_2$. Based on reflected light measurements, however, the dry Comparative Example OpC5 film was considerably lighter than the Comparative Example OpC6 film that contained iron oxide. This was consistent with visual observation. The fugitive pigments appeared to darken the opacified films only slightly and all remained considerably lighter than Comparative Example OpC6 films that contained just the non-fugitive colorant red iron oxide.

With respect to a and b values, the opacified but uncolorized Comparative Example OpC5 film had considerably more red and yellow in it than the non-opacified Comparative Example C5 equivalent. This is to be expected since red iron oxide contains high levels of both these colors. This increase in red and yellow carried through to the colors of the films containing fugitive pigments. In most cases, the fugitive colorized films contained a more intense red color than iron oxide. Example 1 was superior to the others although, in opacified films, all of the pigments were at least equivalent in visibility to iron oxide.

With respect to fading, when incorporated into opacified formulations, the fugitive color pigments faded in the same manner as the non-opacified formulations. However, color emanating from the non fugitive opacifiers, red iron oxide and titanium dioxide, did not fade. These formulations therefore inherently had background colors. As would be expected, such opacified formulations faded only to their background colors.

Examples 9–23, Comparative Examples C6–C13, and Comparative Examples OpC13–OpC15— Pigment Concentrations Examples 9–23 were formulated to investigate the effect of pigment and opacifier concentration when used individually and in combination with each other. The formulations were made using the PHOS-CHEK® D-75 fire retardant and modifications thereto.

The formulations are shown in Table 12 below:

TABLE 12

| Formulation | | # |
|---|---|---|
| PHOS-CHEK ® D-75 | 1.25% STD | C6 |
| Containing | 1.50% STD | C7 |
|  | 1.75% STD | C8 |
|  | 2.00% STD | C9 |
| D-75 with STD replaced by | 1.50% PMT1 | C10 |
|  | 1.75% PMT1 | C11 |
|  | 2.00% PMT1 | C12 |
| D-75 having 1.25% STD and | 0.31% CRIMSON | 9 |
|  | 0.63% CRIMSON | 10 |
|  | 0.94% CRIMSON | 11 |
| D-75 (without STD) with added | 0.0% CRIMSON | C13 |
|  | 0.90% CRIMSON | 12 |
|  | 1.13% CRIMSON | 13 |
|  | 1.35% CRIMSON | 14 |
|  | 1.58% CRIMSON | 15 |
| D-75 (without STD) with 0.5% $TiO_2$ and | 0.0% CRIMSON | OpC13 |
|  | 0.90% CRIMSON | 16 |
|  | 1.13% CRIMSON | 17 |
|  | 1.35% CRIMSON | 18 |
|  | 1.58% CRIMSON | 19 |
| D-75 (without STD) with 1.0% $TiO_2$ and | 0.0% CRIMSON | OpC14 |
|  | 0.90% CRIMSON | 20 |
|  | 1.13% CRIMSON | 21 |
|  | 1.35% CRIMSON | 22 |
|  | 1.58% CRIMSON | 23 |
| D-75 and | 1.0% $Fe_2O_3$ | OpC15 |

Note that the percentages provided in Table 12 are percentages of the dry formulation that is, weight percent of the formulations without any liquid. Thus, for the comparative examples the weight percentages describe the actual weight percent of the colorant added and present in the dried film. However, the dispersions of the invention are about 45% active by weight of the aqueous dispersion, with 55% media. Accordingly, the weight percent added in terms of the dispersions that contained the CRIMSON added to the total fire retardant was 2.22 times the percent shown in Table 12. That is, 0.31 wt % CRIMSON corresponds to adding dispersion containing 0.68 wt % of the aqueous color the CRIMSON, 0.63 wt % CRIMSON, 1.40 wt % of the aqueous color the CRIMSON, 0.90 wt % CRIMSON, 2.0 wt % of the aqueous color the CRIMSON, 0.94 wt % CRIMSON, 2.08 wt % of the aqueous color the CRIMSON, 1.13 wt % CRIMSON, 2.5 wt % of the aqueous color the CRIMSON, 1.35 wt % CRIMSON, 3.0 wt* of the aqueous color the CRIMSON, and 1.58 wt % CRIMSON 3.5 wt % of the aqueous color the CRIMSON.

The preparation of the films of Examples 9–23 were made similarly to the procedures described previously for Examples 1–8. The preparation of the films of Comparative Examples C6–C13, and OpC13–OpC15 were made similarly to the procedures described previously for Comparative Examples C1–C5, and OpC1–OpC6 as appropriate. The testing and data collection procedures were also similar to those described previously.

The data obtained in this study are shown in Tables 13 and 14A–14C. The amount and red color intensity of the light transmitted through the wet and freshly dry film and the initial reflectance data are shown in Table 13. Tables 14A–14C tabulate the degree of fading experienced after 6,000, 12,000 and 18,000 Langleys (2.51, 5.02, and 7.53× $10^8$ $J/M_2$) of natural sunlight exposure. Exposure was conducted during March and April of 1997 at New River, Ariz.

TABLE 13

| # | Active Pigment Content (% of dry retardant concentrate) | Transmission Through Fresh Film | | | | Reflectance Fresh, Dry Film | | |
|---|---|---|---|---|---|---|---|---|
| | | % Transmission | | (a) Red Intensity** | | L Value† | (a) Value** | (b) Value+ |
| | | wet | dry | wet | dry | | | |
| OpC15 | 1.00 | 31.4 | 16.5 | 10.4 | 17.0 | 42.4 | 25.7 | 18.1 |
| C6 | 1.25 | 63.2 | 36.5 | 7.3 | 10.9 | 50.8 | 15.4 | 9.1 |
| C7 | 1.50 | 60.6 | 34.9 | 8.3 | 13.7 | 50.0 | 18.7 | 12.5 |
| C8 | 1.75 | 57.8 | 34.0 | 9.2 | 15.3 | 50.4 | 21.1 | 13.9 |
| C9 | 2.00 | 58.1 | 35.0 | 9.4 | 14.2 | 50.5 | 21.5 | 14.7 |
| C10 | 1.50 | 56.6 | 31.6 | 8.7 | 14.1 | 49.0 | 20.6 | 7.4 |
| C11 | 1.75 | 57.1 | 33.9 | 7.6 | 12.3 | 50.1 | 20.1 | 7.3 |
| C12 | 2.00 | 52.4 | 30.7 | 11.0 | 15.3 | 47.0 | 23.4 | 8.6 |
| 9 | 1.56 | 54.0 | 36.0 | 11.6 | 16.0 | 47.6 | 23.0 | 10.1 |
| 10 | 1.88 | 44.7 | 29.3 | 17.8 | 22.3 | 47.8 | 29.9 | 12.6 |
| 11 | 2.19 | 40.6 | 27.4 | 24.0 | 26.2 | 47.1 | 32.9 | 13.4 |
| C13 | 0.00 | 84.9 | 57.1 | −2.5 | −3.7 | 59.9 | −5.7 | 4.3 |
| 12 | 0.90 | 52.8 | 37.0 | 12.9 | 16.7 | 48.0 | 26.0 | 6.6 |
| 13 | 1.13 | 48.9 | 34.0 | 16.2 | 21.5 | 47.3 | 30.9 | 9.2 |
| 14 | 1.35 | 40.9 | 32.4 | 21.8 | 23.8 | 48.1 | 34.0 | 10.4 |
| 15 | 1.58 | 36.7 | 29.7 | 26.6 | 28.8 | 47.0 | 37.0 | 12.7 |
| OpC13 | 0.50 | 57.9 | 42.3 | −1.7 | −2.7 | 65.6 | −5.2 | 2.6 |
| 16 | 1.40 | 32.4 | 25.3 | 19.4 | 23.0 | 54.3 | 28.4 | 6.3 |
| 17 | 1.63 | 26.5 | 20.2 | 25.5 | 30.4 | 53.3 | 32.1 | 7.7 |
| 18 | 1.85 | 25.5 | 20.8 | 26.0 | 30.0 | 52.5 | 34.4 | 8.9 |
| 19 | 2.08 | 24.1 | 21.2 | 32.5 | 32.3 | 51.6 | 37.7 | 10.9 |
| OpC14 | 1.00 | 43.2 | 35.4 | −1.8 | −2.7 | 69.0 | −5.1 | 2.4 |
| 20 | 1.90 | 23.8 | 19.6 | 23.1 | 24.7 | 57.5 | 27.1 | 4.8 |
| 21 | 2.13 | 23.9 | 18.8 | 26.3 | 27.0 | 57.2 | 30.5 | 6.0 |
| 22 | 2.35 | 18.5 | 16.8 | 31.2 | 32.3 | 54.6 | 33.2 | 7.2 |
| 23 | 2.58 | 18.6 | 16.8 | 34.8 | 33.9 | 53.9 | 35.9 | 8.7 |
| Background tile - no fire retardant film | | | | | | 20.4 | −19.2 | 3.6 |

TABLE 14A

| # | Active Pigment Content (% of dry retardant concentrate) | Reflectance-6K Langleys (2.51 × 10⁸ J/M²) | | |
|---|---|---|---|---|
| | | L Value† | (a) Value** | (b) Value+ |
| OPC15 | 1.00 | 43.6 | 24.6 | 16.9 |
| C6 | 1.25 | 5906 | 1.2 | 5.7 |
| C7 | 1.50 | 58.9 | 0.6 | 8.4 |
| C8 | 1.75 | 60.1 | −0.1 | 8.4 |
| C9 | 2.00 | 59.3 | 1.2 | 10.9 |
| C10 | 1.50 | 49.9 | 17.5 | 6.6 |
| C11 | 1.75 | 50.3 | 16.9 | 6.8 |
| C12 | 2.00 | 47.2 | 20.1 | 8.0 |
| 9 | 1.56 | 56.1 | 7.0 | 7.1 |
| 10 | 1.88 | 57.3 | 13.0 | 8.7 |
| 11 | 2.19 | 56.6 | 16.9 | 8.9 |
| C13 | 0.00 | 56.6 | 1.0 | 6.0 |
| 12 | 0.90 | 53.3 | 14.1 | 7.9 |
| 13 | 1.13 | 52.5 | 18.0 | 9.9 |
| 14 | 1.35 | 54.3 | 21.8 | 10.5 |
| 14 | 1.58 | 53.6 | 24.8 | 11.8 |
| OpC13 | 0.50 | 64.6 | −0.5 | 2.7 |
| 16 | 1.40 | 60.4 | 16.4 | 7.5 |
| 17 | 1.63 | 60.2 | 20.1 | 8.3 |
| 18 | 1.85 | 59.8 | 22.7 | 9.3 |
| 19 | 2.08 | 59.5 | 27.1 | 10.5 |
| OpC14 | 1.00 | 67.9 | −0.7 | 2.1 |
| 20 | 1.90 | 64.5 | 16.2 | 6.1 |
| 21 | 2.13 | 65.0 | 19.5 | 6.8 |
| 22 | 2.35 | 61.8 | 21.3 | 8.1 |
| 23 | 2.58 | 61.0 | 24.5 | 9.0 |
| Background tile no fire retardant film | | 20.4 | −19.2 | 3.6 |

TABLE 14B

| # | Active Pigment Content (% of dry retardant concentrate) | Reflectance-Fresh, Dry Film | | |
|---|---|---|---|---|
| | | L Value† | (a) Value** | (b) Value+ |
| OPC15 | 1.00 | 40.7 | 20.3 | 15.4 |
| C6 | 1.25 | 51.1 | −2.5 | 5.5 |
| C7 | 1.50 | 57.5 | 0.8 | 10.7 |
| C8 | 1.75 | 58.6 | −0.1 | 10.9 |
| C9 | 2.00 | 56.9 | 1.7 | 13.1 |
| C10 | 1.50 | 50.3 | 14.3 | 8.0 |
| C11 | 1.75 | 50.2 | 13.6 | 8.5 |
| C12 | 2.00 | 47.1 | 16.8 | 9.4 |
| 9 | 1.56 | 49.2 | −0.8 | 5.8 |
| 10 | 1.88 | 49.6 | 1.2 | 6.3 |
| 11 | 2.19 | 51.3 | 3.5 | 6.8 |
| C13 | 0.00 | 55.1 | −2.6 | 4.0 |
| 12 | 0.90 | 49.1 | 0.7 | 4.5 |
| 13 | 1.13 | 48.8 | 2.1 | 5.1 |
| 14 | 1.35 | 49.3 | 3.7 | 5.4 |
| 14 | 1.58 | 49.3 | 5.4 | 6.3 |
| OpC13 | 0.50 | 57.3 | −3.1 | 1.7 |
| 16 | 1.40 | 56.9 | 2.7 | 3.9 |
| 17 | 1.63 | 59.1 | 5.2 | 4.9 |
| 18 | 1.85 | 57.1 | 6.6 | 5.3 |
| 19 | 2.08 | 59.3 | 9.4 | 6.1 |
| OpC14 | 1.00 | 62.3 | −2.9 | 1.2 |
| 20 | 1.90 | 63.0 | 3.8 | 3.4 |
| 21 | 2.13 | 62.9 | 5.5 | 3.5 |
| 22 | 2.35 | 62.4 | 7.6 | 5.1 |
| 23 | 2.58 | 62.6 | 9.4 | 5.6 |
| Background tile no fire retardant film | | 20.4 | −19.2 | 3.6 |

TABLE 14C

| # | Active Pigment Content (% of dry retardant concentrate) | Reflectance-Fresh, Dry Film L Value† | (a) Value** | (b) Value+ |
|---|---|---|---|---|
| OPC15 | 1.00 | 42.0 | 20.0 | 15.5 |
| C6 | 1.25 | 51.6 | −1.9 | 7.4 |
| C7 | 1.50 | 57.6 | 1.0 | 12.8 |
| C8 | 1.75 | 58.8 | 0.1 | 13.3 |
| C9 | 2.00 | 56.7 | 1.9 | 15.2 |
| C10 | 1.50 | 52.4 | 11.0 | 9.8 |
| C11 | 1.75 | 52.4 | 10.2 | 10.8 |
| C12 | 2.00 | 48.9 | 13.5 | 11.5 |
| 9 | 1.56 | 49.9 | −1.1 | 7.4 |
| 10 | 1.88 | 50.4 | −0.3 | 7.5 |
| 11 | 2.19 | 52.2 | 0.9 | 7.8 |
| C13 | 0.00 | 55.4 | −1.8 | 5.7 |
| 12 | 0.90 | 49.8 | −1.0 | 5.3 |
| 13 | 1.13 | 49.6 | −0.3 | 5.5 |
| 14 | 1.35 | 50.3 | 0.5 | 5.5 |
| 14 | 1.58 | 50.3 | 1.3 | 6.1 |
| OpC13 | 0.50 | 57.0 | −2.3 | 4.1 |
| 16 | 1.40 | 57.0 | 0.1 | 4.9 |
| 17 | 1.63 | 59.4 | 1.4 | 5.7 |
| 18 | 1.85 | 57.9 | 2.1 | 5.8 |
| 19 | 2.08 | 60.2 | 3.4 | 5.8 |
| OpC14 | 1.00 | 61.4 | −2.1 | 3.5 |
| 20 | 1.90 | 63.0 | 0.6 | 4.7 |
| 21 | 2.13 | 63.3 | 1.3 | 4.4 |
| 22 | 2.35 | 62.8 | 2.8 | 5.6 |
| 23 | 2.58 | 63.0 | 3.8 | 5.7 |
| Background tile no fire retardant film | | 20.4 | −19.2 | 3.6 |

**As described previously, positive (+) values indicate red color, negative (−) values indicate green color, and higher numbers denote a greater intensity.
†When the L value = 0, the color is black; when the L value is 100, the color is white.
+As described–previously, positive (+) values indicate blue color, negative (−) values indicate yellow color, and higher numbers denote a greater intensity.

Comparative Example C6, which includes PHOS-CHEK® D-75 containing added 1.25% STD fugitive powder pigment, is a standard fire retardant solution. Increasing the concentration of the STD pigment to levels as high as 2.0% resulted in only minor improvements in the hiding ability and red intensity of the wet film, as shown by examination of Comparative Examples C6–C9. No improvement in hiding performance was seen in the dry film although the red intensity increased to nearly the level exhibited by a PHOS-CHEK® fire retardant prepared from a dry-powder concentrate containing 1.0 wt % red iron oxide. Thus, the data shows that the red iron oxide (Comparative Example OpC15) was superior to the formulation colored with 2.0% STD dry-powder fugitive pigment (Comparative Example C9) when compared in both the wet and dry films.

The Radiant Color PMT1 pigment's performance, at equal concentration, was somewhat superior to the standard fugitive color STD's performance in both the hiding ability and in the red intensity of the wet film. Neither property was significantly different from that of STD in the dry film, however, as shown by examination of Comparative Examples C6–C12.

In the case of Examples 9, 10, and 11, standard PHOSCHEK® D-75 retardant concentrate containing 1.25V STD dry-powder fugitive pigment was used as the base material. CRIMSON was added to the D-75/1.25% STD solution at dry-pigment added levels of 0.31, 0.63 and 0.94 wt % based on the amount of contained fugitive pigment in the CRIMSON liquid dispersion. This was equivalent to a 25, 50 and 75% increase in pigment solids relative to the standard D-75/1.25% STD product. This is also equivalent to 0.68, 1.40 and 2.08% of the liquid dispersion added to D-75 containing the standard 1.25% amount of STD. Similarly to the previous Examples of this invention, the aqueous fugitive-color CRIMSON suspension was added into the mixed D-75 solution and not to the dry D-75 powder.

While very significantly improving the hiding ability of both the wet and dry film, the highest level used in this study did not reach the level of hiding ability of 1.0% red iron oxide. On the other hand, the red intensity of the formulations were superior to 1.0% iron oxide at the intermediate addition concentration, i.e., 1.40 t CRIMSON suspension addition. Further, the rate of fade of this mixture was slower than the standard color but nonetheless rapid enough to pass the U.S. Forest Service requirements. A somewhat slower rate of fade relative to the current STD pigment is believed advantageous in order to assure that fade does not occur during that period of time when visibility is desired.

In Examples 12–15, the CRIMSON pigment dispersion was added to the basic uncolorized D-75 solution (without the STD powder pigment) at concentrations of 2.0, 2.5, 3.0 and 3.5% of the dry-powder used to prepare the fire retardant solution—that is, 2.0, 2.5, 3.0 and 3.5% by weight of the dry ingredients. Only 2.0% (0.9% pigment solids) of the CRIMSON suspension was necessary to provide the red color intensity of the Comparative Example OpC15 (PHOS-CHEK® D-75 having additional it iron oxide). However, it is estimated that 4.0% (1.8% pigment solids) CRIMSON would be required to provide opacification equal to Comparative Example OpC15. The rate of fade of Examples 12–15 were adequate to meet U.S. Forest Service requirements.

Example 16, which contained 2.0% CRIMSON (0.9% pigment solids) exhibited equivalent wet opacification and considerably greater red intensity than the standard 1.0% red iron oxide of Comparative Example OpC15. Somewhat higher concentrations of CRIMSON would be required to obtain an opacity level superior to red iron oxide.

Example 20, which contained 2.0% CRIMSON (0.9% pigment solids) exhibited wet opacification and red intensity considerably superior to the 1.0% red iron oxide of Comparative Example OpC15. It is believed that this formulation would be considerably more visible from the air than Comparative Example OpC15, although the additional titanium dioxide tended to reduce red intensity, making the color more pastel.

Examples 24 and 25, Comparative Examples C16–C15—Coverage Level

Examples 24 and 25, and comparative examples C16–C15 illustrate the impact of fire retardant solution coverage (application) level on the opacity and color characteristics of the retardants. The previous experiments provided data from 0.032 inch (0.081 cm) thick wet films of the various formulations. That film thickness is equivalent to a fire retardant solution coverage level of 2.0 gpc (0.7 L/M$^2$). Standard PHOS-CHEK® D-75 (D-75) containing 1.25% STD (based on the dry-powder retardant weight) is sufficiently visible when applied on light (yellow, tan and light to deep green) fuels of moderate height at application rates as low as 2 gpc (0.7 L/M$^2$). In some cases, however, solutions prepared with this formulation are difficult to see when the application is made to dark green, tall timber fuel types even when the coverage level is considerably higher, such as 8 gpc (2.8 L/M$^2$). In these latter cases, the fuel color can appear to be very dark, bordering on black, dependent on the amount of sunlight and the direction of approach. A further problem is that, when applied in tall timber, the solution penetrates through the forest canopy. That portion of the solution which does not lie on top of the forest canopy is, therefore, at least partially obscured from view from above. Accordingly, the standard formulation can be improved—particularly for uses where the solution is applied to tall and dark colored fuel types.

The formulations in this test series are shown in Table 15 below. Film thicknesses of 0.022, 0.032, 0.064, and 0.128 inches (0.056, 0.081, 0.163, and 0.325 cm) were prepared. However, it was observed that films thicker than about 0.032 inch (0.081 cm) continued to flow after application for the standard D-75 formulation. Such after-flow resulted in varying and unknown thicknesses for the test films prepared with the standard D-75 solution. To compensate for this, an increased amount of guar gum thickener was used in the composition in order to increase the viscosity of the solution and thereby reduce after-flow. Comparative Example C16 is standard PHOS-CHEK® D-75 retardant solution prepared with a dry powder formulation containing 1.25% STD at the standard viscosity. Comparative Example C17 is identical to Comparative Example C16, except that the amount of guar gum thickener was increased to 7.25%. This resulted in a solution viscosity for Comparative Examples C17 and C18, and Examples 24 and 25 of about 2660 cps.

Comparison of Comparative Example C16 with Comparative Example C17 shows that the modification made to viscosity had no significant impact on light transmission and color characteristics.

Three fugitive pigments were included in this experiment, i.e., the standard dry pigment (STD), the PMT1 standard dry pigment, and the CRIMSON aqueous color pigment dispersion of the present invention. Example 24 used CRIMSON to enhance the color of the existing (Agency qualified) PHOS-CHEK® D-75 with additional 1.25% STD, and consequently contained a higher total pigment loading than the other formulations.

The films were prepared in a similar manner as described previously except the gap in the doctor blade was adjusted to provide wet film thicknesses of 0.022, 0.032, 0.064 and 0.128 inches (0.056, 0.081, 0.163, and 0.325 cm). The thinnest film (0.022 inch, 0.056 cm) is considered too thin for practical use in any but the least severe fire situations, but was-included in the experimentation since that is the standard thickness used in the U.S. Forest Service test protocols for evaluating fugitive color fading. Film thicknesses of 0.032 and 0.064 inches (0.081 and 0.163 cm), were chosen to more closely represent real world application rates (2 and 4 gpc, or 0.7 and L/M$^2$). The 0.128 inch (0.325 cm) thick films flowed to some extent even at the higher viscosity level. In view of this, actual film thicknesses were not known and color quantification measurements not made. If should be noted, however, that this thick film corresponds to an 8 gpc (2.8 L/M$^2$) application rate which is reasonable for application on to tall timber areas of greatest concern relative to fire retardant visibility.

The data development techniques used in this study were similar to those described earlier except that, in some cases, reflected light measurements were made on both the top and bottom (through the glass) of the test films. This was done because it was observed that, in the thicker films, fading occurred from the exposed top through the film.

Sunlight exposure measurements were recorded during this study series. The test film plates were placed on the exposure stand on Mar. 31, 1997. The rates of exposure during the exposure period were as follows:

| Date | Total Exposure (Langleys) | Average Rate (Langleys/day) |
| --- | --- | --- |
| Mar. 31, 1997 | 0 | |
| Apr. 14, 1997 | 6,000 | 429 |
| May 2, 1997 | 12,000 | 444 |
| May 27, 1997 | 18,000 | 450 |
| Jun. 19, 1997 | 24,000 | 444 |

TABLE 15

| | Comp. Ex. C16 (D-75 containing 1.25% STD) | Comp. Ex. C17 (Comp. Ex. C16 with Increased Viscosity) | Comp. Ex. C18 (D-75 containing 1.25% PMT1 with Increased Viscosity) | Ex. 24 (Comp. Ex. C17 with 0.7% CRIMSON | Ex. 25 (Uncolored D-75 solution containing 2.78% CRIMSON |
| --- | --- | --- | --- | --- | --- |
| Viscosity (cps) | 1667 | 2660 | 2660 | 2667 | 2883 |
| | (%) | (%) | (%) | (%) | (%) |
| Guar | 6.00 | 7.25 | 7.25 | 7.25 | 7.25 |
| | | | Fugitive Color | | |
| STD | 1.25 | 1.25 | | 1.25 | |
| PMT1 | | | 1.25 | | |
| CRIMSON | | | | 0.70 | 2.78 |
| % Active | 1.25 | 1.25 | 1.25 | 1.56 | 1.25 |

TABLE 16

| Film Thickness/gpc | Comp. Ex. C16 (D-75 with (D-75 with additional 1.25% STD) | Comp. Ex. C17 (D-75 with additional 1.25% STD and Increased Viscosity) | Comp. Ex. C18 (D-75 w/1.25% PMT1 and Incr. Viscosity) | Ex. 24 (Comparative Ex. C17 w/0.70% CRIMSON & Incr. Viscosity) | Ex. 25 (D-75 w/2.78% CRIMSON and Incr. Viscosity) |
|---|---|---|---|---|---|
| Viscosity (cps) | 1667 | 2660 | 2660 | 2667 | 2883 |
| LIGHT TRANSMISSION OF THROUGH THE WET FILM (Y) | | | | | |
| 0.022 in./1.37 | 73 | 71 | 72 | 65 | 58 |
| 0.032 in. 12.0 | 69 | 68 | 65 | 58 | 50 |
| 0.064 in./4.0 | 44 | 47 | 42 | 30 | 22 |
| RED COLOR INTENSITY (a) OF THE WET FILM | | | | | |
| 0.022 in./1.37 | 3 | 3 | 3 | 8 | 12 |
| 0.032 in. 12.0 | 5 | 5 | 6 | 11 | 18 |
| 0.064 in./4.0 | 16 | 14 | 14 | 26 | 40 |
| RELATIVE DARKNESS OF THE WET FILM BLACK/DARK = 0 and white/light = 100) | | | | | |
| 0.022 in./1.37 | 88 | 87 | 88 | 85 | 81 |
| 0.032 in. 12.0 | 86 | 86 | 85 | 81 | 76 |
| 0.064 in./4.0 | 72 | 74 | 71 | 61 | 54 |
| YELLOW COLOR INTENSITY (b) OF THE WET FILM | | | | | |
| 0.022 in./1.37 | 4 | 3 | 2 | 3 | 0 |
| 0.032 in. 12.0 | 5 | 4 | 2 | 4 | 0 |
| 0.064 in./4.0 | 11 | 9 | 5 | 10 | 8 |

TABLE 17

IMPACT OF DRYING ON LIGHT AND COLOR TRANSMISSION THROUGH FILMS

| Film Thickness/gpc | Comp. Ex. C16 (D-75 with additional 1.25% STD) | Comp. Ex. C17 (D-75 with additional 1.25% STD and Increased Viscosity) | Comp. Ex. C18 (D-75 w/1.25% PMT1 and incr. Viscosity) | Ex. 24 (Comparative Ex. C17 w/0.70% CRIMSON & incr. Viscosity) | Ex. 25 (D-75 w/2.78% CRIMSON AND Incr. Viscosity) |
|---|---|---|---|---|---|
| Viscosity (cps) | 1667 | 2660 | 2660 | 2667 | 2883 |
| Δ LIGHT TRANSMISSION DURING DRYING (ΔY) | | | | | |
| 0.022 in./1.37 | 73 to 47 | 71 to 46 | 72 to 47 | 65 to 43 | 58 to 39 |
| 0.032 in./2.0 | 69 to 43 | 68 to 37 | 65 to 40 | 58 to 36 | 50 to 32 |
| 0.064 in./4.0 | 44 to 56 | 47 to 33 | 42 to 32 | 30 to 23 | 22 to 21 |
| 0.128 in/8.0 | too fluid | NA to 22 | NA to 19 | NA to 17 | NA to 17 |
| Δ RED INTENSITY (higher values indicate a more intense red) | | | | | |
| 0.022 in./1.37 | 3 to 6 | 3 to 6 | 3 to 6 | 8 to 11 | 12 to 16 |
| 0.032 in./2.0 | 5 to 9 | 5 to 10 | 6 to 10 | 11 to 18 | 18 to 22 |
| 0.064 in./4.0 | 16 to 13 | 14 to 18 | 14 to 20 | 26 to 28 | 40 to 35 |
| Δ DARKNESS OF THE FILM (where black = 0 and white = 100) | | | | | |
| 0.022 in./1.37 | 88 to 74 | 88 to 74 | 88 to 74 | 86 to 71 | 81 to 69 |
| 0.032 in./2.0 | 86 to 72 | 86 to 68 | 85 to 69 | 81 to 67 | 76 to 63 |
| 0.064 in./4.0 | 72 to 72 | 74 to 64 | 71 to 63 | 61 to 55 | 54 to 53 |
| Δ YELLOW COLOR INTENSITY (higher values indicate a more intense yellow color) | | | | | |
| 0.022 in./1.37 | 4 to 9 | 3 to 9 | 2 to 6 | 3 to 8 | 0 to 5 |
| 0.032 in./2.0 | 5 to 11 | 4 to 12 | 2 to 8 | 4 to 11 | 0 to 7 |
| 0.064 in./4.0 | 11 to 12 | 9 to 12 | 5 to 10 | 10 to 16 | 8 to 11 |

| | Comp. Ex. C16 (D-75 with additional 1.25% STD) | Comp. Ex. C17 (D-75 with additional 1.25% STD and increased Viscosity) | Comp. Ex. C18 (D-75 w/1.25% PMT1 and Incr. Viscosity) | Ex. 24 (Comparative Ex. C17 w/0.70% CRIMSON & Incr. Viscosity | Ex. 25 (D-75 w/2.78% CRIMSON and Incr. Viscosity) |
|---|---|---|---|---|---|
| Viscosity (cps) | 1667 | 2660 | 2660 | 2667 | 2883 |
| A. Lightness of the Color (L value where black = 0 and white = 100 | | | | | |
| initial | 49 | 51 | 50 | 49 | 48 |
| after 6K Langleys | 48 | 47 | 46 | 46 | 45 |
| after 12K Langleys | 48 | 48 | 47 | 47 | 47 |
| after 18K Langleys | 47 | 47 | 46 | 46 | 46 |
| after 24K Langleys | 46 | 46 | 45 | 45 | 44 |
| after 30K Langleys | 44 | 44 | 43 | 43 | 44 |
| B. Red intensity (positive (a) values indicate intensity of red: negative values indicate green color) | | | | | |
| initial | 9 | 10 | 11 | 19 | 24 |
| after 6K Langleys | −2 | −1 | 7 | 1 | 7 |
| after 12K Langleys | −2 | −1 | 5 | 0 | 2 |
| after 18K Langleys | −2 | −2 | 3 | −2 | −1 |
| after 24K Langleys | −2 | −2 | 2 | −1 | −2 |
| after 30K Langleys | −3 | −2 | 1 | −2 | −2 |
| C. Yellow Color Intensity (positive (b) values indicates yellow, negative values indicate blue) | | | | | |
| initial | 5 | 6 | 3 | 8 | 5 |
| after 6K Langleys | 5 | 4 | 4 | 5 | 4 |
| after 12K Langleys | 6 | 6 | 6 | 6 | 5 |
| after 18K Langleys | 7 | 7 | 6 | 7 | 5 |
| after 24K Langlays | 7 | 7 | 6 | 7 | 5 |
| after 30K Langleys | 7 | 7 | 7 | 7 | 6 |

COLOR AND FADING CHARACTERISTICS OF 0.022" (0.056 CM) THICK FUGITIVE COLOR FILMS FOLLOWING EXPOSURE TO SUNLIGHT

TABLE 18B

COLOR AND FADING CHARACTERISTICS OF 0.032" (0.081 CM) THICK FUGITIVE COLOR FILMS FOLLOWING EXPOSURE TO SUNLIGHT

| | Comp. Ex. C16 (D-75 with additional 1.25% STD) | Comp. Ex. C17 (D-75 with additonal 1.25% STD and Increased Viscosity) | Comp. Ex. C18 (D-75 w/1.25% PMT1 and Incr. Viscosity) | Ex. 24 (Comparative Ex. C17 w/0.70% CRIMSON & Incr. Viscosity | Ex. 25 (D-75 w/2.78% CRIMSON and Incr. Viscosity) |
|---|---|---|---|---|---|
| Viscosity (cpa) | 1667 | 2660 | 2660 | 2667 | 2883 |
| A. Lightness of the Color (L value where black = 0 and white = 100) | | | | | |
| initial | 52 | 53 | 52 | 50 | 48 |
| after 6K Langleys | 48 | 54 | 55 | 55 | 47 |
| after 12K Langleys | 50 | 53 | 55 | 55 | 49 |
| after 18K Langleys | 49 | 54 | 56 | 55 | 49 |
| after 24K Langleys | 48 | 52 | 54 | 54 | 47 |
| after 30K Langleys | 46 | 50 | 52 | 52 | 45 |
| B. Red Intensity (positive (a) values indicate intensity of red; negative values indicate green color) | | | | | |
| initial | 16 | 15 | 19 | 26 | 31 |
| after 6K Langleys | 0 | 1 | 9 | 4 | 10 |
| after 12K Langlays | 0 | 0 | 7 | 2 | 5 |
| after 18K Langleys | −1 | −1 | 6 | 0 | 2 |
| after 24K Langleys | −1 | 0 | 4 | 0 | 0 |
| after 30K Langleys | −1 | −1 | 4 | 0 | −1 |
| C. Yellow Color Intensity (positive (b) values indicates yellow, negative values indicate blue | | | | | |
| initial | 9 | 9 | 6 | 12 | 9 |
| after 6K Langleys | 6 | 6 | 5 | 7 | 6 |
| after 12K Langleys | 8 | 8 | 7 | 8 | 7 |
| after 18K Langleys | 9 | 9 | 7 | 9 | 7 |
| after 24K Langleys | 9 | 10 | 8 | 10 | 7 |
| after 30K Langleys | 9 | 10 | 9 | 10 | 7 |

COLOR AND FADING CHARACTERISTICS OF 0.064" (0.163 CM) THICK FUGITIVE COLOR FILMS FOLLOWING EXPOSURE TO SUNLIGHT

| | Comp. Ex. C16 (D-75 with addtional 1.25% STD) | Comp. Ex. C17 (D-75 with additional 1.25% STD and Increased Viscosity) | Comp. Ex. C18 (D-75 w/1.25% PMT1 and Incr. Viscosity) | Ex.24 (Comparative Ex. C17 w/0.70% CRIMSON & Incr. Viscosity) | Ex. 25 (D-75 w/2.78% CRIMSON and Incr. Viscosity) |
|---|---|---|---|---|---|
| Viscosity (cps) | 1067 | 2660 | 2660 | 2667 | 2883 |
| A. Lightness, of the Color (L value where black = 0 and white = 100) | | | | | |
| initial | 52 | 54 | 53 | 52 | 51 |
| after 6K Langleys | 60 | 61 | 59 | 61 | 58 |
| after 12K Langleys | 60 | 60 | 60 | 61 | 59 |
| after 18K Langleys | 60 | 60 | 60 | 60 | 59 |
| after 24K Langleys | 59 | 59 | 59 | 59 | 58 |
| after 30K Langleys | 57 | 58 | 58 | 58 | 57 |
| B. Red Intensity (positive (a) values indicate Intensity of red; negative values indicate green color | | | | | |
| initial | 21 | 27 | 29 | 35 | 46 |
| after 6K Langleys | 2 | 4 | 11 | 8 | 15 |
| after 12K Langleys | 1 | 3 | 9 | 5 | 10 |
| after 18K Langleys | 0 | 1 | 7 | 2 | 6 |
| after 24K Langleys | 0 | 2 | 6 | 2 | 5 |
| after 30K Langleys | 0 | 2 | 5 | 2 | 4 |
| C. Yellow Color Intensity (positive (b) values indicates yellow, negative values indicate blue) | | | | | |
| initial | 13 | 17 | 12 | 17 | 18 |
| after 6K Langleys | 9 | 9 | 6 | 8 | 7 |
| after 12K Langleys | 10 | 11 | 7 | 9 | 7 |
| after 18K Langleys | 11 | 11 | 8 | 10 | 8 |
| after 24K Langleys | 12 | 13 | 9 | 11 | 9 |
| after 30K Langleys | 13 | 13 | 10 | 12 | 9 |

TABLE 18D

COLOR AND FADING CHARACTERISTICS OF 0.128" (0.325 CM) THICK FUGITIVE COLOR FILMS FOLLOWING EXPOSURE TO SUNLIGHT

| | Comp. Ex. C16 (D-75 with additional 1.25% STD) | Comp. Ex. C17 (D-75 with additional 1.25% STD with Increased Viscosity) | Comp. Ex. C18 (D-75 w/1.25% PMT1 and Incr. Viscosity) | Ex. 24 (Comparative Ex. C17 w/0.70% CRIMSON & Incr. Viscosity) | Ex. 25 (D-75 w/2.78% CRIMSON and Incr. Viscosity) |
|---|---|---|---|---|---|
| Viscosity (cps) | 1667 | 2660 | 2660 | 2667 | 2883 |
| A. Lightness of the Color (L value where black = 0 and white = 100) | | | | | |
| initial | 43 | 45 | 41 | 43 | 43 |
| after 6 K Langleys | 62 | 61 | 68 | 63 | 56 |
| after 12 K Langleys | 61 | 60 | 57 | 62 | 56 |
| after 18 K Langleys | 62 | 60 | 57 | 62 | 57 |
| after 24 K Langleys | 61 | 58 | 56 | 61 | 56 |
| after 30 K Langleys | 59 | 59 | 58 | 62 | 57 |
| B. Red Intensity (positive (a) values indicate intensity of red; negative values indicate green color) | | | | | |
| initial | 20 | 33 | 31 | 38 | 46 |
| after 6 K Langleys | 5 | 10 | 17 | 15 | 24 |
| after 12 K Langleys | 3 | 6 | 14 | 10 | 19 |
| after 18 K Langleys | 1 | 4 | 11 | 7 | 12 |
| after 24 K Langleys | 2 | 4 | 11 | 6 | 11 |
| after 30 K Langleys | 2 | 3 | 8 | 5 | 8 |
| C. Yellow Color Intensity (positive (b) values indicates yellow, negative values indicate blue) | | | | | |
| initial | 11 | 22 | 13 | 20 | 24 |
| after 6 K Langleys | 9 | 11 | 8 | 12 | 16 |
| after 12 K Langleys | 12 | 13 | 9 | 13 | 15 |
| after 18 K Langleys | 12 | 14 | 9 | 14 | 16 |
| after 24 K Langleys | 13 | 15 | 10 | 15 | 15 |
| after 30 K Langleys | 13 | 13 | 9 | 13 | 16 |

The results are shown in Tables 16, 17, 18A–18D and 19A–19C. Table 16 illustrates the percentage and color of the light, which was transmitted through the wet film. As might be expected, these data show that the percent of light transmitted through the film decreased (opacity increased) and the intensity of the color increased with film thickness or coverage level. Table 17 illustrates the changes in light transmission and color intensity which occurred during drying of the fire retardant film. Light transmission decreased (opacification increased) as the film dried. It is believed that this is due to the precipitation of the dissolved solids as the solvent evaporated. The data indicate, as well, that color intensified during drying. This was inconsistent with the visual appearance of the film in that the film appeared to become more pastel as it dried. Tables 18A–18D illustrate the rate of fading of the various films and thicknesses of films during exposure to natural sunlight. These characteristics were measured initially and after exposures of 6K, 12K, 18K, 24K, and 30K Langleys (2.51, 5.02, 7.53, 10.04, and 12.55×10$^8$. The data from the unexposed values in Tables 18A–18D showed that little change in color intensity occurred as the film thickness was increased beyond about 0.064 inch (0.163 cm).

The CRIMSON pigmented Example 25 was significantly superior to the other formulations. Example 24, the standard D-75, with additional 1.25% STD, enhanced with a small amount of CRIMSON, was better than the other formulations, e.g., Comparative Examples C16–C18. Further, while iron oxide provided greater film opacification, CRIMSON was superior in terms of color intensity. Example 24 was equivalent to iron oxide in that regard, while Example 25 provided a considerably brighter color.

The data also showed that color fading (fire retardant disappearance) slowed with increasing fire retardant solution coverage level. The exposed color values in Tables 18A–D show that the 0.032 inch (0.056 cm) thick Comparative Example C16 films (standard D-75) lost its red color within about 3,000 Langleys (1.26×10$^8$J/M$^2$) of exposure. The exposure required to bleach the Comparative Example C16 films increased to more than 6,000 Langleys (2.51×10$^8$J/M$^2$) for 0.064 inch (0.163 cm, 4 gpc or 1.4 L/M$^2$) films and to more than 12,000 Langleys (5.02×10$^8$J/M$^2$) for 0.128 inch (0.325 cm, 8 gpc or 2.8 L/M$^2$) films.

CRIMSON fugitive pigment dispersion was used to colorize the PHOS-CHEK® D-75 fire retardant solution of Example 25. The data show that when exposed in accordance with U.S. Forest Service protocols, i.e., 0.022 inch (0.056 cm) films and 18,000 Langleys (7.53×10$^8$J/M$^2$) of natural sunlight exposure, the solution totally disappeared. Accordingly, the requirements of the U.S. Forest Service specifications for color fade were met by the 0.022 inch (0.056 cm) films of Example 25. When the experiment was performed on 0.032 inch films, although some color did remain, the color also faded to an acceptable level.

When applied at a 0.064 inch thickness, however, the Example 25 films retained a small amount of red color after even 30,000 Langleys (12.55×10$^8$J/M$^2$) of sunlight exposure. Further, when applied at 0.128 inch thickness (8 gpc or 2.8 L/M$^2$), the CRIMSON colorized film retained a greater red color intensity after 24,000 Langleys (10.04×10$^8$J/M$^2$) of sunlight exposure than Comparative Example C16—the standard PHOS-CHEK® D-75, with additional 1.25% STD—possessed prior to exposure.

Examples 26–32, Comparative Examples C19, C29, OpC16, and OpC17—Comparison of Unopacified Fire Retardants Samples of uncolored PHOS-CHEK® D-75 and colored D-75, colored with added STD dry-powder fire retardants, were prepared similarly to the Comparative Examples previously described above. The dry powders were mixed with water to the standard use-level in the standard manner, i.e., at a mix ratio of 143.8 grams per liter of tap water (1.2 pounds per gallon) to form mother solutions. 1.8 liters of each mother solution was prepared. The viscosity of each mother solution was 1500±50 cps when measured at about 70° F. (21° C.)

These uncolored and STD colored mother solutions were then divided into 400 milliliter aliquots. Comparative Examples C19 and C20, respectively, are the uncolored and STD colorized mother solutions from which the Examples 26–29 and 30–32, respectively, were prepared. Examples 26–29 were formed by adding the fugitive-color aqueous pigment colorant suspension, SG517-31 ("APD1") manufactured by Day-Glo Color Corp., to the uncolored mother solutions. Examples 30–32 were formed by adding APD1 to the STD-colored mother solutions. Comparative Examples OpC16 and OpC17 were colorized with 1.0% and 1.25% red iron oxide respectively. The preparation of these solutions is summarized below:

| Sample Number | Colorant | | |
| --- | --- | --- | --- |
|  | STD | APD1 | Opacified |
| Comp. Ex. C19 | NO | NO | NO |
| 26 | NO | YES | NO |
| 27 | NO | YES | NO |
| 28 | NO | YES | NO |
| 29 | NO | YES | NO |
| Comp. Ex. C20 | YES | No | NO |
| 30 | YES | YES | NO |
| 31 | YES | YES | NO |
| 32 | YES | YES | NO |
| Comp. Ex. OpC16 | NO | NO | YES |
| Comp. Ex. OpC17 | NO | NO | YES |

Each addition of the aqueous pigment dispersion APD1 was made with sufficient agitation to uniformly distribute the dispersion into the mother solution aliquot within 5 minutes. The APD1 fugitive color pigment suspension was similar to CRIMSON, except a different dye was incorporated in the polymer particle. The amount of pigment solids and suspension added to the aliquots is described below in Table 20.

Opacified Comparative Examples OpC16 and OPC17 contained red iron oxide as the color pigment and were prepared for comparative purposes. Comparative Example OpC16 was the PHOS-CHEK® D-75 fire retardant with 0.126% red iron oxide pigment in the solution (1.0% red iron oxide in the powder). This iron oxide colored product is commercially available and has been used in the field with adequate visibility. Comparative Example OpC17 was D-75 with the amount of added red iron oxide pigment increased to 0.157W based on solution weight.

Films of the various formulations were prepared on glass plates as described previously above. In this case, three different film thicknesses of each formulation were prepared: 0.022, 0.032, and 0.064 inches (0.559, 0.813, and 1.626 mm). The thicknesses are equivalent to a wet application rate of 1.5, 2.0 and 4.0 gallons, respectively, of fire retardant solution, per 100 square feet of surface. Fugitive color fading was evaluated in accordance with U.S. Forest Service requirements on films with a thickness of 0.022" (0.559 mm). As described earlier, a 2.0 gpc (0.032", 0.813 mm) fire retardant coverage level is considered adequate for the average fire in many fuel types, while a 4.0 gpc (0.064", 0.626 mm) fire retardant application rate is the minimum requirement for heavy brush and timber where fugitive colored fire retardants are more difficult to see. It is, therefore, likely that the 4.0 gpc or 0.064" (1.626 mm)

situation would more nearly approximate a problemed field condition.

TABLE 20

Composition of Solutions from the Mother Solutions.

| Sample No. | Mother Solution | Added APD1 Color Suspension (g) | % APD1 Color Suspension (g)** | % Pigment Solids* | Pigment Level• |
|---|---|---|---|---|---|
| 26 | Uncolored | 0.708 | 0.18 | 0.078 | 0.50 |
| 27 | Uncolored | 1.044 | 0.26 | 0.115 | 0.73 |
| 28 | Uncolored | 1.396 | 0.35 | 0.154 | 0.98 |
| 29 | Uncolored | 1.753 | 0.44 | 0.193 | 1.23 |
| C19 | Uncolored | 0 | 0 | 0 | 0 |
| C20 | STD | 0 | 0 | 0 | 0 |
| 30 | STD | 0.348 | 0.09 | 0.0328 | 0.24 |
| 31 | STD | 0.704 | 0.18 | 0.077 | 0.49 |
| 32 | STD | 1.057 | 0.26 | 0.116 | 0.74 |
| Comp. Ex. OpC16 | $Fe_2O_3$ | 0 | 0 | 0 | 0 |
| Comp. Ex. OpC16 | $Fe_2O_3$ | 0 | 0 | 0 | 0 |

*APD1 color suspension contained about 44% pigment solids.
**In fire retardant solution when mixed at use-level, does not include the STD pigment in the D-75-with-STD mother solutions.
•Relative to Standard PHOS-CHEK® D-75 with STD added which contained 0.157k pigment solids. Does not include the STD pigment in the D-75-with-STD mother solution.

The films were characterized using the same procedures as described above. Light transmission measurements through the wet and dry films were obtained at 20 minutes, 120 minutes, and about 24 hours after application. The plates were stored at ambient temperatures (70° F.±50° F., 21° C.±30° C.) during that time. After 20 minutes, the film was still wet and some flow occurred when the film was held in a vertical position. After 2 hours, the film was still somewhat wet but flow did not occur when the film was held in a vertical position. The film was totally dry 24 hours after application. These time periods and degrees of dryness encompassed that time and condition, in practice, when the visibility of the fire retardant application is needed. The transmission values were converted to opacification values (opacification is equal to 100 minus transmission). Table 21 below illustrates the degree of opacity exhibited by the thus formed films.

formulation, and (iii) the degree of dryness of the application. The impact of 2 hours drying of the fire retardant solution at ambient indoor temperatures was relatively insignificant in terms of the films' abilities to hide that on which they were applied. However, the fire retardant salts and other water soluble components in the fire retardant formulation precipitate during drying and would be expected to contribute to film opacification. Such precipitation would occur more rapidly during actual fire use when temperatures are higher and drying winds present. Accordingly, two hours in actual fire use conditions would likely contribute more opacity than that opacity generated from these relatively mild ambient indoor conditions.

Comparison of the data for the samples that were made at equal aqueous pigment loadings show that the aqueous pigment suspension APD1 was superior in opacification ability to the currently used dry-powder STD pigment. Example 28 had a 0.154% pigment loading of APDI, while Comparative Example C20 had a 0.157% pigment loading of STD dry-

TABLE 21

THE IMPACT OF PIGMENT CONCENTRATION AND FILM THICKNESS ON OPACIFICATION

| Sample Number | 22 milliinch Film Thickness Opacification (100 − Y) | | | 32 milliinch Film Thickness Opacification (100 − Y) | | | 64 milliinch Film Thickness Opacification (100 − Y) | | |
|---|---|---|---|---|---|---|---|---|---|
| | 20 min. ◊ | 2 hrs. ◊ | 24 hrs. ◊ | 20 min. | 2 hrs. | 24 hrs. | 20 min. | 2 hrs. | 24 hrs. |
| C19 | 14 | 14 | 45 | 14 | 15 | 41 | 16 | 15 | 45 |
| 26 | 29 | 29 | 56 | 33 | 35 | 55 | 53 | 43 | 65 |
| 27 | 34 | 34 | 64 | 39 | 39 | 65 | 53 | 43 | 65 |
| 28 | 39 | 39 | 62 | 46 | 48 | 69 | 67 | 59 | 69 |
| 29 | 43 | 43 | 62 | 52 | 53 | 68 | 72 | 67 | 76 |
| C20 | 29 | 28 | 55 | 35 | 35 | 62 | 47 | 47 | 63 |
| 30 | 36 | 34 | 59 | 40 | 41 | 65 | 63 | 58 | 70 |
| 31 | 42 | 41 | 65 | 48 | 48 | 67 | 71 | 60 | 74 |
| 32 | 45 | 45 | 66 | 54 | 55 | 74 | 74 | 67 | 78 |
| Comp. Ex. Op16 | — | 60 | 77 | 69 | 73 | 85 | — | 91 | 92 |
| Comp. Ex. Op17 | — | 68 | 83 | 87 | 74 | 87 | — | 91 | 93 |

◊ Indicates length of time between film drawdown and measurement. 20 minutes is considered equal to wet; 24 hrs. is considered equal to dry.

The data in Table 21 indicate that opacity increased with (i) film thickness, (ii) the amount of pigment in the powder pigment. Nevertheless, Example 28 was superior to Comparative Example C20 in opacity. Similarly, Example 29 had a 0.193% pigment loading of APD1, while Example 30 had a 0.038% loading of APD1 and 0.157% loading of STD for a total of 0.195% pigment loading, but Example 29 was superior to Example 30 in opacity.

Non-fugitive red iron oxide was superior to both the dry-powder STD and the aqueous pigment dispersion APD1 in opacifying capability. The data show that iron oxide levels in excess of the currently used level do not appreciably increase opacity.

Table 22 illustrates the color intensity of non-faded, dry fugitive color films of varying thickness. The above-described methods of preparation and testing were used. The results are shown in Table 22.

TABLE 22

THE COLOR INTENSITY OF NON-FADED, DRY FUGITIVE COLOR FILMS OF VARYING THICKNESS

| Sample Number | 22 milliinch Film Thickness Reflectance | | | 32 milliinch Film Thickness Reflectance | | | 64 milliinch Film Thickness Reflectance | | |
|---|---|---|---|---|---|---|---|---|---|
| | L | a | b | L | a | b | L | a | b |
| C19 | 56 | −5 | 2 | 56 | −5 | 3 | 57 | −6 | 4 |
| 26 | 49 | 14 | −1 | 52 | 21 | 1 | 49 | 21 | 1 |
| 27 | 47 | 19 | −1 | 47 | 23 | 1 | 48 | 28 | 2 |
| 28 | 46 | 22 | 0 | 49 | 30 | 2 | 46 | 33 | 4 |
| 29 | 46 | 27 | 1 | 46 | 32 | 3 | 48 | 39 | 5 |
| C20 | 50 | 10 | 7 | 49 | 14 | 10 | 48 | 17 | 12 |
| 30 | 48 | 17 | 7 | 48 | 22 | 9 | 47 | 26 | 11 |
| 31 | 47 | 23 | 7 | 49 | 29 | 9 | 46 | 30 | 11 |
| 32 | 46 | 26 | 7 | 47 | 33 | 10 | 46 | 38 | 13 |
| Comp. Ex. Op 16 | 45 | 22 | 16 | 43 | 24 | 17 | 42 | 27 | 18 |
| Comp. Ex. Op 17 | 43 | 25 | 18 | 43 | 27 | 19 | 40 | 28 | 19 |

The data in Table 22 reveal that the intensity of the red color component (a Value) in the fire retardant film increased with pigment content and film thickness. The data is in accordance with the observation that fire retardant films, in general, become darker and more intensely red with increasing pigment content of the formulation.

Similar to above, comparison of the data for the samples that were made at equal pigment loadings show that the aqueous pigment suspension APD1 provided a considerably more intense red color than the currently used dry-powder STD pigment. Example 28 had a 0.154% pigment loading of APD1, while Comparative Example C20 had a 0.157% pigment loading of STD dry-powder pigment. Yet Example 28 was superior to Comparative Example C20 in color. Similarly, Example 29 had a 0.193% pigment loading of APD1, while Example 30 had a 0.038% loading of APD1 and 0.157% loading of STD for a total of 0.195% pigment loading. Yet Example 29 was superior to Example 30 in color.

The D-75 formulations provided red intensity values equal to 0.126% red iron oxide when the D-75 formulations contained about 0.115% of the APD1 pigment suspension or a combination of 0.157% of the currently used STD dry-pigment and 0.038% of the APD1 pigment suspension. The data indicate that red intensity increased more with pigment loading when using the fugitive pigments than when using red iron oxide. In the latter case it may be due to the loading of iron oxide having reached a point of diminishing return. Therefore, the visibility of the fugitive films would improve to a greater extent than would the visibility of the iron oxide pigment films as the fire retardant application rate increases.

The data show that film darkened (decreased L Value) with increased pigment loading regardless of the type of pigment. Increased film thickness, on the other hand, appeared to have little effect on the L Value.

Color intensity was measured on all films after exposure to 0, 6K, 12K and 18K Langleys (0, 2.51, 5.02, and $7.53 \times 10^8 \text{J/M}^2$) of natural sunlight. In those cases where traces of a red color continued to be present in the films after 18K Langleys ($7.53 \times 10^8 \text{J/M}^2$), exposure of the films was continued to 24K Langleys ($10.04 \times 10^8 \text{J/M}^2$). Table 22 below illustrates the color intensity of the fresh dried (unexposed) films. Tables 23, 24, and 25 below illustrate the rate of fading (fugitive) as a function of sunlight exposure.

TABLE 23

THE COLOR INTENSITY OF FADED FUGITIVE COLOR FILMS OF VARYING THICKNESS AFTER 6K LANGLEYS (2.51 × 10⁸ J/M²) EXPOSURE

| Sample Number | 22 milliinch Film Thickness Reflectance | | | 32 milliinch Film Thickness Reflectance | | | 64 milliinch Film Thickness Reflectance | | |
|---|---|---|---|---|---|---|---|---|---|
| | L | a | b | L | a | b | L | a | b |
| C19 | 57 | −2 | 2 | 58 | −1 | 4 | 59 | −6 | 4 |
| 26 | 56 | 7 | 3 | 60 | 11 | 6 | 58 | 12 | 6 |
| 27 | 55 | 10 | 4 | 56 | 13 | 6 | 58 | 17 | 8 |
| 28 | 53 | 12 | 4 | 58 | 19 | 7 | 56 | 22 | 9 |
| 29 | 54 | 16 | 5 | 56 | 21 | 7 | 59 | 28 | 11 |

TABLE 23-continued

THE COLOR INTENSITY OF FADED FUGITIVE COLOR FILMS OF VARYING THICKNESS AFTER 6K LANGLEYS (2.51 × 10$^8$ J/M$^2$) EXPOSURE

| Sample Number | 22 milliinch Film Thickness Reflectance | | | 32 milliinch Film Thickness Reflectance | | | 64 milliinch Film Thickness Reflectance | | |
|---|---|---|---|---|---|---|---|---|---|
| | L | a | b | L | a | b | L | a | b |
| C20 | 58 | −2 | 4 | 59 | 0 | 7 | 59 | 1 | 9 |
| 30 | 57 | 3 | 4 | 58 | 5 | 6 | 58 | 8 | 8 |
| 31 | 56 | 8 | 5 | 59 | 11 | 7 | 57 | 13 | 9 |
| 32 | 56 | 11 | 5 | 58 | 16 | 8 | 57 | 21 | 11 |

TABLE 24

THE COLOR INTENSITY OF FADED FUGITIVE COLOR FILMS OF VARYING THICKNESS AFTER 12K LANGLEYS (5.02 × 10$^8$ J/M$^2$) EXPOSURE

| Sample Number | 22 milliinch Film Thickness Reflectance | | | 32 milliinch Film Thickness Reflectance | | | 64 milliinch Film Thickness Reflectance | | |
|---|---|---|---|---|---|---|---|---|---|
| | L | a | b | L | a | b | L | a | b |
| C19 | 55 | 0 | 7 | 57 | −5 | 3 | 58 | 2 | 10 |
| 26 | 53 | 2 | 3 | 57 | 6 | 9 | 58 | 7 | 10 |
| 27 | 54 | 4 | 7 | 57 | 7 | 9 | 58 | 9 | 10 |
| 28 | 51 | 3 | 5 | 53 | 8 | 8 | 57 | 12 | 11 |
| 29 | 49 | 4 | 5 | 53 | 9 | 8 | 56 | 16 | 12 |
| C20 | 56 | 0 | 8 | 58 | 2 | 11 | 58 | 2 | 10 |
| 30 | 55 | 2 | 9 | 58 | 4 | 11 | 60 | 4 | 12 |
| 31 | 52 | 3 | 8 | 56 | 6 | 11 | 59 | 6 | 13 |
| 32 | 55 | 5 | 9 | 56 | 8 | 12 | 59 | 8 | 12 |

TABLE 25

THE COLOR INTENSITY OF FADED FUGITIVE COLOR FILMS OF VARYING THICKNESS AFTER 18K (7.53 × 10$^8$ J/M$^2$) LANGLEYS EXPOSURE

| Sample Number | 22 milliinch Film Thickness Reflectance | | | 32 milliinch Film Thickness Reflectance | | | 64 milliinch Film Thickness Reflectance | | |
|---|---|---|---|---|---|---|---|---|---|
| | L | a | b | L | a | b | L | a | b |
| C19 | 48 | −3 | 4 | 52 | −2 | 6 | 51 | −2 | 6 |
| 26 | 51 | −2 | 3 | 55 | 0 | 6 | 53 | 1 | 7 |
| 27 | 52 | −1 | 3 | 55 | 0 | 5 | 53 | 2 | 7 |
| 28 | 51 | −1 | 3 | 53 | 1 | 5 | 54 | 3 | 7 |
| 29 | 51 | 0 | 3 | 54 | 2 | 5 | 53 | 5 | 8 |
| C20 | 49 | 3 | 6 | 56 | −1 | 10 | 57 | 0 | 10 |
| 30 | 52 | 2 | 6 | 54 | −1 | 8 | 56 | 2 | 12 |
| 31 | 53 | 1 | 6 | 57 | 0 | 8 | 55 | 2 | 10 |
| 32 | 55 | 0 | 6 | 59 | 3 | 9 | 56 | 5 | 11 |

Comparison of the data in Table 22 with that in Tables 23, 24, and 25 illustrates the change in the color characteristics (L, a and b values) of the dried fire retardant films as a function of sunlight exposure, i.e., after 0, 6K, 12K and 18K Langleys (0, 2.51, 5.02, and 7.53×10$^8$ J/M$^2$) of outdoor Arizona sunlight radiation. The red iron oxide pigmented films were not subjected to sunlight exposure since they do not fade.

The data reveal that the rate of color disappearance from both the dry-powder STD and the aqueous-pigment-dispersion colorized fire retardant films decreased with the concentration of pigment in the film and the thickness of the fire retardant film. Measurements made on equivalent films show that the rate of fade of the pigment of the aqueous-pigment-dispersion of this invention was significantly slower than the dry-powder pigment.

Even the thickest, 64-milliinch (1.626 mm) film containing the conventionally used STD dry-powder fugitive pigment lost all of its red color component in less than 6K Langleys (2.51×10$^8$J/M$^2$) of sunlight exposure, i.e., in less than 10 days in the October sun near Phoenix, Ariz. The pigment APD1 suspended in the aqueous-pigment-dispersion met the U.S. Forest Service fading requirement of the total disappearance of color in a 22-milliinch (0.559 mm) film after 18K Langleys exposure (7.53×10$^8$ J/M$^2$), at all the pigment loading levels in the Examples, while retaining more red color component after 6K Langleys (2.51×10$^8$ J/M$^2$) of sunlight exposure than were contained in the dry-powder pigment STD containing fire retardants prior to exposure.

Most of the red color component in thin films (22 milli-inch or 0.559 mm) of the pigment APD1 suspended in the aqueous-pigment-dispersion faded after 12K Langleys (5.02×10$^8$ J/M$^2$) of exposure (in 32 days), however some red color remained even after 18K Langleys (7.53×10$^8$ J/M$^2$) (in 53 days) in the thicker (64 milliinch or 1.626 mm) films. The last traces of red color component in even the thickest of the films disappeared between 18K and 24K Langleys (7.53 and $10.04 \times 10^8$ J/M$^2$) of sunlight exposure.

The data show that the suspended pigment APD1 in the aqueous-pigment-dispersion was superior to the dry-powder pigment STD in terms of its ability to opacify the base D-75 fire retardant. However, neither of the fugitive color pigments by itself was equivalent to red iron oxide with respect to opacification or hiding ability. Therefore, for applications where opacification or hiding ability is particularly important, a hiding pigment such as, for example, titanium dioxide can be included to improve the opacification or hiding ability of the fire retardants.

Examples 33–57, Comparative Examples C21–C35 and OpC18OpC20—Color, Visibility, Stability, Corrosivity, and Pumpability In the previous examples, the aqueous pigment dispersions of the invention were added to fire retardant solutions prepared by mixing dry-powder concentrates in water at their prescribed mix ratios. As described previously, other types of wildland fire retardant concentrates are also known.

The aqueous pigment dispersions of this invention were added to all three of the fire retardant concentrates described previously—dry powder concentrates, fluid concentrates, and liquid concentrates—and to their solutions prepared at their product-specific mix ratios. This study was conducted to determine if the point of introduction of the aqueous pigment dispersion into the fire retardant mixture has any impact on its ability both to colorize and then to fade after exposure to natural sunlight.

Seven fire retardant concentrates were prepared: i) an uncolored dry-powder type D-75; ii) a colored dry-powder type, D-75, containing STD dry-powder pigment; iii) an uncolored fluid concentrate type prepared from the same components as D75; iv) an uncolored liquid concentrate type fire retardant prepared with a 10-34-0 liquid fertilizer solution; v) an uncolored fluid concentrate type prepared with the same components as PHOS-CHEK® ARL/AFL fire retardants, vi) D-75 containing 1.0% TiO$_2$ and 0.25% red iron oxide; and vii) the uncolored fluid concentrate of an uncolored fluid concentrate type prepared from the same components as D75, but containing 0.49% TiO$_2$ and 0.12% red iron oxide.

Concentrates (i), (ii) and (vi) were dry-powder types where the constituent ingredients were mixed together without adding water. These dry-powder products were subsequently mixed with water at their prescribed mix ratios to form the fire retardant solutions ready for application. Concentrates (iii), (iv), (v) and (vii) were fluid concentrate types mixed with water at their product-specific mix ratios to form fire retardant solutions ready for application. Only concentrate (ii) contained a colorizing pigment.

The effect of the addition of the aqueous pigment dispersions of this invention was tested by adding an aqueous pigment dispersion (either CRIMSON or APD1) to aliquots of each of the concentrates, and to each of the fire retardant solutions prepared from each concentrate. For comparison, the currently used STD dry-powder fugitive pigment was added to aliquots of each of the concentrates and to solutions prepared therefrom.

The appearance of each of the mixtures of the concentrates and the colorants was noted and then the concentrates were mixed with water at their product specific ratio to form the end-use fire retardant solution. This procedure resulted in solutions of each of the fire retardant types prepared (i) with the color pigment added to the concentrate prior to the preparation of the end-use fire retardant solution, and (ii) with the addition occurring after the preparation of the end-use solution.

Films 32 milliinch (0.813 mm) thick were prepared on glass plates from each of the diluted solutions. The visual appearance of the films was noted and the degree of opacification, color, color intensity and rate of fade after exposure to natural sunlight was determined photometrically. The presence/absence of pigments and opacifiers, and the point of mixing when the pigments/opacifiers were added, for each test sample are summarized below:

| Ex. No. | Pigment Type | Opacified | Pigments/ Opacifiers Added To |
|---|---|---|---|
| 33, 34 | Aqueous Dispersion | NO | Dry-Powder Concentrate |
| 35 | Aqueous Dispersion | YES | Dry-Powder Concentrate |
| 36, 37 | Dry-Powder and Aqueous Dispersion | YES | Dry-Powder Concentrate |
| 38, 39 | Dry-Powder and Aqueous Dispersion | NO | Fluid Concentrate |
| 43, 44 | Aqueous Dispersion | NO | Fluid Concentrate |
|  | Aqueous Dispersion | YES | Fluid Concentrate |
| 41, 42 | Aqueous Dispersion | NO | Fluid Concentrate |
| 45–47, 51, 52, 54–57 | Aqueous Dispersion | NO | Added At Final Dilution |
| 48, 53 | Aqueous Dispersion | YES | Added At Final Dilution |
| 49, 50 | Dry-Powder and Aqueous Dispersion | YES | Added At Final Dilution |
| C21, C23, C25, C27 | None | NO | No Additional Pigments/ Opacifiers Added |
| C22, C30, C31 | Dry-Powder | NO | Dry-Powder Concentrate |
| C24, C26, C28 | Dry-Powder | NO | Fluid Concentrate |
| C32–C35 | Dry-Powder | NO | Added At Final Dilution |
| OPC18 | None | YES | Dry-Powder Concentrate |
| OPC19 | Dry-Powder | YES | Dry-Powder Concentrate |
| OPC20 | None | YES | Fluid Concentrate |

As described above, the concentrates and solutions were mixed with either the STD fugitive color pigment or with one of the aqueous pigment suspension colorants obtained from Day-Glo Color Corporation. In these tests, the CRIMSON and APD1 pigments were considered equivalent in being both aqueous pigment suspensions. The colorants and/or opacifiers were added to either the concentrate prior to dilution to final end-use fire retardant form, or to the end-use solution as indicated in the table above.

Examples 33–37 were prepared by adding the aqueous pigment suspension colorant to the dry powder D-75 concentrate. Examples 35–37 also included opacifiers. Examples 36 and 37 further included the STD dry-pigment.

Examples 38–40, 43 and 44 were prepared by adding the aqueous pigment suspension colorant to the fluid concentrate type fire retardants prior to mixing with water. Examples 38 and 39 also included STD dry-powder pigment. Example 40 included opacifiers.

Examples 41 and 42 were prepared by adding the aqueous pigment suspension colorant to the liquid concentrate type fire retardant prior to mixing with water.

Comparative Example C22 added the STD dry-pigment to the D-75 dry-powder concentrate type fire retardant prior to mixing with water.

Comparative Examples C24, C26, and C28 added the STD dry-pigment to the fluid concentrate type fire retardant prior to mixing with water.

Opacified Comparative Example OpC19 added the STD dry-pigment and opacifiers to the dry-powder concentrate type fire retardant prior to mixing with water.

Opacified Comparative Example OpC20 added just the opacifiers to a fluid concentrate type fire retardant prior to mixing with water, while Opacified Comparative Example OpC18 added just the opacifiers to the dry powder concentrate type fire retardant prior to mixing with water, each without any fugitive colorants.

As described above, after addition of the pigments and/or opacifiers, each of the above concentrates were diluted to their end-use concentration.

Comparative Examples C21, C23, C25, and C27 were unmodified base fire retardants. Comparative Examples C22, C30, and C31-were PHOS-CHEK® D-75 dry powder formulation that included the STD dry-powder pigment.

Examples 45–57 added the aqueous pigment dispersion to the final fire retardant after dilution to the end-use concentration. Examples 48 and 53 also included opacifiers. Examples 49 and 50 included opacifiers and the STD dry-powder pigment. Similarly, Comparative Examples C32–C35 added the dry-powder pigment to the final fire retardant after dilution to the end-use concentration.

Further dilution was not necessary, of course, in the above cases where the colorant was added to the final fire retardant solution. Each of the solutions was allowed to set undisturbed overnight so that any entrapped air would dissipate. Films of each of the solutions were then drawn down on glass plates in the normal manner to a thickness of 32 milliinch (0.813 mm). The visual appearance of the film, wet and dry opacification, initial color, and color intensity were measured within about 24 hours of film preparation. In some cases, the color and appearance of the films were visually non-uniform. In those cases, instrumental measurement of opacity and color intensity was not meaningful. Consequently, instrumental measurements were not made in those cases. Instead, the appearance of the film was noted.

After the twenty four hour data were obtained, the glass plates were exposed to natural sunlight in the Phoenix, Ariz. area. The remaining (faded) color and color intensity of the films were measured after 6K, 12K, 18K (2.51, 5.02, and $7.53 \times 10^8$ J/M$^2$) and, in some cases, 24K Langleys (10.04× $10^8$ J/M$^2$) of natural sunlight exposure. The data are shown in Tables 26A and 26B below. Table 26A shows the data when the pigment was added to the fire retardant concentrate prior to the concentrate's dilution to the final end-use concentration. Table 26B shows the data obtained when the pigment was added to the fire retardant fluid at its end-use concentration.

In Tables 26A and 26B, the pigment addition percentage does not include any pigment in the base material. The CRIMSON and APD1 aqueous pigment dispersions contained 44% active pigment solids. The STD dry-pigment contained 100% active pigment solids.

TABLE 26A

The Impact Of The Timing Of Pigment Addition On The Opacity And Color Of 32 Milliinch Thick Fire Retardant Films (All measurements were made on diluted solutions. All measurements, except opacification at 2 hours, were made on dry films.)

| Sample Number | Base Material | Pigment Addition Type | (%) | % Opacification (100-Y) 2 hrs | 24 hrs | 0 Langley Exposure L a b | 6K Langley Exposure L a b | 12K Langley Exposure L a b | 18K Langley Exposure L a b |
|---|---|---|---|---|---|---|---|---|---|
| C21 | D-75 powder | none | 0.000 | 14 | 41 | 56 −5 3 | 62 −3 3 | 60 −2 6 | 53 −3 4 |
| 33 | D-75 powder | CRIMSON | 0.157 | Pigment suspension agglomerated when added to dry powder: meaningful opacification and color measurements could not be obtained. | | | | | |
| 34 | D-75 powder | APD1 | 0.157 | Pigment suspension agglomerated when added to dry powder: meaningful opacification and color measurements could not be obtained. | | | | | |
| C22 | D-75 powder | STD | 0.157 | 35 | 59 | 50 15 11 | 61 −1 6 | 58 2 11 | 55 −2 9 |
| OpC18 | OpD-75 powder | none | 0.000 | 65 | 73 | 61 7 8 | 61 9 9 | 60 11 11 | 61 9 10 |
| 35 | OpD-75 powder | CRIMSON | 0.157 | 58 | 71 | 55 15 9 | 57 14 11 | 57 14 12 | 57 12 11 |
| 36 | C22 powder opacified | CRIMSON | 0.0785 | Pigment suspension agglomerated when added to dry powder: meaningful opacification and color measurements could not be obtained. | | | | | |
| 37 | C22 powder opacified | APD1 | 0.0785 | Pigment suspension agglomerated when added to dry powder: meaningful opacification and color measurements could not be obtained. | | | | | |
| OpC19 | C22 powder opacified | STD | 0.0785 | 42 | 64 | 49 22 15 | 60 1 8 | 59 2 12 | 56 −1 11 |
| C23 | HVW conc. | none | 0.000 | 14 | 42 | 57 −6 4 | 63 −1 5 | 59 2 7 | 55 −2 4 |
| 38 | HVW conc. | CRIMSON | 0.130 | Pigment suspension agglomerated in concentrate. | | | | | |
| 39 | HVW conc. | APD1 | 0.130 | Pigment suspension agglomerated in concentrate. | | | | | |
| C24 | HVW conc. | STD | 0.130 | 26 | 54 | 52 8 7 | 62 −1 6 | 61 2 8 | 57 −2 5 |
| OpC20 | OpHVW conc. | none | 0.000 | 71 | 77 | 60 11 13 | 62 13 12 | 59 14 14 | 58 11 11 |
| 40 | OpHVW conc. | CRIMSON | 0.130 | 81 | 86 | 54 34 14 | 60 26 15 | 57 20 14 | 58 15 12 |
| C25 | LCW conc. | none | 0.000 | Unthickened solution "runs" rather than remaining at desired thickness. Film thickness unknown. | | | | | |
| 41 | LCW conc. | CRIMSON | 0.269 | Pigment appeared to agglomerate in the concentrate. Also, low viscosity sol'ns do not maintain desired thickness. | | | | | |

TABLE 26A-continued

The Impact Of The Timing Of Pigment Addition On The Opacity And Color Of 32 Milliinch Thick Fire Retardant Films (All measurements were made on diluted solutions. All measurements, except opacification at 2 hours, were made on dry films.)

| Sample Number | Base Material | Pigment Addition Type | (%) | % Opacification (100-Y) 2 hrs | 24 hrs | 0 Langley Exposure L a b | 6K Langley Exposure L a b | 12K Langley Exposure L a b | 18K Langley Exposure L a b |
|---|---|---|---|---|---|---|---|---|---|
| 42 | LCW conc. | APD1 | 0.269 | Pigment appeared to agglomerate in the concentrate. Also, low viscosity sol'ns do not maintain desired thickness. | | | | | |
| C26 | LCW conc. | STD | 0.269 | Pigment did not totally disperse when added to concentrate prior to dilution. Also, low viscosity sol'ns do not maintain desired thickness. | | | | | |
| C27 | AWL conc. | none | 0.000 | 11 | 59 | 71 −5 6 | 78 0 4 | 78 −1 4 | 75 −1 4 |
| 43 | AWL conc. | CRIMSON | 0.130 | Pigment did not disperse when added to the concentrate prior to dilution. | | | | | |
| 44 | AWL conc. | APD1 | 0.130 | Pigment did not disperse when added to the concentrate prior to dilution. | | | | | |
| C28 | AWL conc. | STD | 0.130 | Pigment did not disperse when added to the concentrate prior to dilution. | | | | | |

Examples 36, 37, and Comparative Example OpC19 each contained 1.0% titanium dioxide, 0.25% red iron oxide, and 0.157% STD. The HVW base material used in Examples 38 and 39, and Comparative Example C24 contained 0.61% STD pigment solids; in these cases, 1.0 volume (Sp. grav. 1.26) of the concentrate was diluted with 3.6 volumes of water. The OpHVW base material used in Example 40 and Comparative Example OpC20 contained 0.49 t $TiO_2$ and 0.12% red iron oxide. The LCW base material used in Examples 41, 42, and Comparative Example C26 contained 1.5% STD pigment solids; in these cases, 1.0 volume (Sp. grav. 1.40) of the concentrate was diluted with 4.0 volumes of water. The AWL base material used in Examples 43, 44, and Comparative Example C28 contained 0.685% STD pigment solids; in these cases, 1.0 volume (Sp. grav. 1.26) of the concentrate was diluted with 4.0 volumes of water.

Table 26A illustrates the visual appearance and data obtained when the color pigment is added to the fire retardant concentrate prior to preparation of the solutions. When the aqueous pigment suspension was added to the dry-powder, liquid or fluid fire retardant concentrates, the pigment particles generally agglomerated. High shear and prolonged mixing during dilution to prepare the final fire retardant solutions were unsuccessful in redispersion of the pigment agglomerates from the concentrates. Accordingly, although these samples used the aqueous pigment suspensions of the invention, their resulting fire retardant solutions, being agglomerated, are not examples of the invention.

The currently used evaluation procedures were inadequate to evaluate unthickened liquid concentrate solutions. All of the films were prepared with solutions at use-level mix concentrations. Thus, they exhibited the viscosities that the end-use fire retardants would exhibit at the time of their application to fuel or fire.

The gum thickened fire retardants generally exhibited viscosities in the range of 1000 to 1500 cps, while the unthickened liquid concentrate solutions exhibited a very low (<50 cps) viscosity. Wet films of the low viscosity solutions continued to flow after the film was prepared, thereby resulting in an unknown lower film thickness. In these cases, the film thickness gradually decreased and depended on the rate of drying.

TABLE 26B

The Impact Of The Timing Of Pigment Addition On The Opacity And Color Of 32 Milliinch Thick Fire Retardant Films (All measurements were made on diluted solutions. All measurements, except opacification at 2 hours, were made on dry films.)

| Sample Number | Base Material | Pigment Addition Type | (%) | % Opacification (100-Y) 2 hrs | 24 hrs | 0 Langley Exposure L a b | 6K Langley Exposure L a b | 12K Langley Exposure L a b | 18K Langley Exposure L a b |
|---|---|---|---|---|---|---|---|---|---|
| C29 | D-75 sol'n | none | 0.000 | 15 | 45 | 62 −6 5 | 63 −2 5 | 58 2 9 | 52 −3 6 |
| 45 | D-75 sol'n | CRIMSON | 0.157 | 58 | 67 | 47 32 10 | 56 19 10 | 52 8 9 | 53 2 5 |
| 46 | D-75 sol'n | CRIMSON | 0.157 | 53 | 64 | 47 29 9 | 55 17 9 | 56 8 10 | 55 1 6 |
| 47 | D-75 sol'n | APD1 | 0.157 | 50 | 68 | 48 33 3 | 57 21 9 | 54 9 9 | 54 2 5 |
| C30 | D-75 sol'n | STD | 0.157 | Dry pigment did not totally disperse in thickened solution, meaningful opacification and color measurements could not be obtained. | | | | | |
| C31 | D-75 sol'n | STD | 0.157 | 32 | 53 | 49 13 11 | 59 −2 7 | 63 −1 10 | 57 −2 80 |
| 48 | OpD-75 sol'n | CRIMSON | 0.157 | 82 | 85 | 53 34 11 | 57 23 12 | 58 17 12 | 61 12 10 |
| 49 | C22 sol'n | CRIMSON | 0.0785 | 53 | 67 | 47 30 13 | 57 11 9 | 56 6 11 | 52 0 9 |

TABLE 26B-continued

The Impact Of The Timing Of Pigment Addition On The Opacity And Color Of 32 Milliinch Thick Fire Retardant Films (All measurements were made on diluted solutions. All measurements, except opacification at 2 hours, were made on dry films.)

| | | | | | | Color Characterization | | | | | | | | | | |
|---|---|---|---|---|---|---|---|---|---|---|---|---|---|---|---|---|
| | | | | % Opacification (100-Y) | | 0 Langley Exposure | | | 6K Langley Exposure | | | 12K Langley Exposure | | | 18K Langley Exposure | | |
| Sample Number | Base Material | Pigment Addition Type | (%) | 2 hrs | 24 hrs | L | a | b | L | a | b | L | a | b | L | a | b |
| 50 | C22 sol'n | APD1 | 0.0785 | 47 | 67 | 47 | 29 | 10 | 56 | 11 | 8 | 56 | 7 | 11 | 54 | 1 | 9 |
| C32 | C22 sol'n | STD | 0.0785 | Dry pigment did not totally disperse in thickened solution, meaningful opacification and color measurements could not be obtained. | | | | | | | | | | | | | |
| 51 | HVW sol'n | CRIMSON | 0.130 | 50 | 70 | 50 | 27 | 95 | 60 | 16 | 9 | 52 | 6 | 8 | 49 | 1 | 6 |
| 52 | HVW sol'n | APD1 | 0.130 | 45 | 66 | 50 | 26 | 4 | 60 | 17 | 8 | 54 | 8 | 8 | 51 | 2 | 6 |
| C33 | HVW sol'n | STD | | Pigment would not totally disperse in thickened solution | | | | | | | | | | | | | |
| 53 | OpHVW sol'n | CRIMSON | 0.130 | 84 | 86 | 54 | 34 | 14 | 59 | 25 | 15 | 57 | 19 | 14 | 57 | 15 | 13 |
| 54 | LCW sol'n | CRIMSON | 0.269 | Low viscosity film "runs" resulting in unknown film thickness, measurements considered meaningless. | | | | | | | | | | | | | |
| 55 | LCW sol'n | APD1 | 0.269 | Low viscosity film "runs" resulting in unknown film thickness, measurements considered meaningless. | | | | | | | | | | | | | |
| C34 | LCW sol'n | STD | 0.269 | Pigment did not totally disperse when added to the diluted solution. Also, low viscosity sol'ns do not maintain desired thickness. | | | | | | | | | | | | | |
| 56 | AWL sol'n | CRIMSON | 0.130 | 49 | 78 | 56 | 35 | 11 | 76 | 20 | 9 | 77 | 7 | 7 | 75 | 4 | 7 |
| 57 | AWL sol'n | APD1 | 0.130 | 43 | 75 | 56 | 34 | 4 | 75 | 18 | 6 | 76 | 6 | 5 | 73 | 3 | 6 |
| C35 | AWL sol'n | STD | 0.130 | Dry pigment did not disperse in thickened solution, meaningful opacification and color measurements could not be obtained. | | | | | | | | | | | | | |

Comparative Examples C30 and C31 were identical compositions except that Comparative Example C31 was made with additional shear agitation to more uniformly distribute the STD particles.

Examples 45 and 46 were identical compositions to each other except that the CRIMSON aqueous pigment dispersion used in Example 46 was skimmed from the top portion of the contents of a 55 gallon drum of CRIMSON that had been undisturbed for the prior 76 days. This experiment was conducted to demonstrate that the aqueous pigment dispersion is relatively stable and remains uniform when undisturbed during storage. The only slightly lower color intensities observed after about two and a half months of storage is deemed quite adequate for practical field use.

Table 26B illustrates the observations and data obtained when the color pigments were added to the fire retardant solution after dilution to end-use concentration. The aqueous pigment dispersion colorants of the invention added in this manner easily dispersed in the fire retardant solution whereas the dry-powder pigment was more difficult to disperse, particularly in the high viscosity fire retardant solutions.

Table 26A shows that the aqueously dispersed pigment, however, agglomerated in Examples 38, 39, 41, and 42, when added to the fluid and liquid concentrates. It was observed that, when added to the liquid concentrates, the pigment of the aqueous pigment suspension was attracted to the attapulgus clay and formed agglomerates that rapidly settled to the bottom of the solution. This phenomenon also occurred when the aqueous pigment suspension was added to the dilute fire retardant solutions prepared from liquid concentrates, although, in that case, the agglomerates were smaller and consequently settled somewhat slower to leave a clear solution above the sediment.

When the clay was omitted from the liquid concentrate formulation, the suspension pigment did not agglomerate, but instead remained dispersed throughout the diluted fire retardant solution for over 7 days. Accordingly, the liquid and fluid fire retardant concentrates, other fire retardant formulations, and uncolorized fire retardant solutions of the invention should not contain attapulgus clay or other agglomerating constituents unless such agglomerating properties are effectively offset by other ingredients.

The above results show that the fugitive aqueous pigment dispersion/suspensions become unstable, tending to agglomerate, separate and settle from their media when added to fire retardant concentrates of all types, e.g., dry-powder, liquid or fluid types. Further, once the aqueous pigment dispersion forms agglomerates, those agglomerates resist redispersion. Consequently, fire retardant concentrates must be pre-diluted with water in order to obtain the benefits of using an aqueous pigment dispersion. The amount of dilution required can be any convenient dilution and may vary with the fire retardant type. However, the aqueous pigment dispersion/suspensions must be added to fire retardant solutions at a concentration of the fire retardant solution that won't cause agglomeration of the aqueous pigment dispersion/suspensions. It is preferred to add the aqueous pigment dispersion/suspensions to the fire retardant fluid at the fire retardant's end-use concentration.

The rate of fade of fire retardant films formed with aqueous pigment dispersion/suspensions were slower than the films incorporating the currently used dry-powder pigment. This is advantageous since no significant fading would immediately occur after dispensing, and yet the rate of fade does occur within the current required limits.

Example 46

The viscosity stability of D-75F solutions comprised of fugitive pigments was examined. Small amounts of the CRIMSON aqueous pigment suspension was mixed with D-75F fire retardant solution, and stored at 70° and 90° F. (21° and 32° C.) for about thirteen months. A small steel coupon was suspended in the elevated temperature samples in accordance with the U.S. Forest Service protocols. Solution viscosity was measured 24 hours after the solution was prepared and then periodically through the storage period. The data presented in Table 28 below indicate that the aqueous pigment suspension had a slightly negative impact on viscosity stability, although the observed differences may be within the experimental error of the test procedure.

The U.S. Forest Service specifications require that the fire retardant solution maintain≧60% of its original viscosity when stored (with a steel coupon) for one year at ambient temperatures. The tests were conducted in Missoula, Mont. and San Dimas, Calif. However, components which are not incorporated in the stored fire retardant solution (components that are added at a time near the time of use of the fire retardant) are only required by the U.S. Forest Service to be storage stable for 30 days. Therefore, the aqueous pigment dispersions have more than adequate storage stability for the application of adding to form the colorized fire retardant solutions of the invention as the delivery vehicle is being loaded.

TABLE 28

IMPACT OF FUGITIVE PIGMENT SUSPENSION ON VISCOSITY OF D-75F SOLUTION

| Storage Temp (° F./° C.) | % Pigment Addition | 24 hr. Viscosity* | % Viscosity Gain (+) or Loss after | | | | |
|---|---|---|---|---|---|---|---|
| | | | 30 days | 90 days | 180 days | 252 days | 388 days |
| 72° F./ 21° C. | 0.00 | 1627 | 1 | 1 | 1 | 2 | 2 |
| | 0.04 | 1607 | 2 | 1 | 2 | 3 | 2 |
| | 0.08 | 1603 | 2 | 2 | 2 | 2 | 1 |
| | 0.12 | 1600 | 4 | 2 | 1 | 3 | 1 |
| 90° F. 132° C.** | 0.00 | 1627 | −5 | −13 | −24 | −28 | −37 |
| | 0.04 | 1607 | −4 | −17 | −28 | −31 | −34 |
| | 0.08 | 1603 | −3 | −19 | −27 | −41 | −44 |
| | 0.12 | 1600 | −3 | −19 | −35 | −40 | −44 |

*Viscosity measured at 70–720 F. (21–220 C.) with a Brookfield Viscometer rotating at 60 rpm with No. 4 spindle.
**A small steel coupon was suspended in the samples stored at 90° F. (32° C.) to accelerate instability Example 47

A study was made to determine if freezing would be a problem if containers of the neat aqueous pigment dispersion/suspension were stored outdoors at low temperatures, such as might be encountered at an air tanker base during winter. It was found that the various aqueous pigment dispersion/suspension froze at or near 35° F. (2° C.). Importantly, no significant separation occurred during or following ten freeze-thaw cycles conducted over a three month period.

The neat aqueous pigment dispersion/suspension was pumped through an about one-inch I.D. hose at rates of about 0.43 to about 1.94 gallons per minute. The following data was obtained.

| Pump Speed (rpm) | CRIMSON Flow (gPm) | Water Flow (gpm) |
|---|---|---|
| 100 | 0.43 | 0.43 |
| 300 | 1.20 | 1.24 |
| 00 | 1.94 | 1.90 |

The fugitive pigment suspension was shown to be pumpable when using a small semipositive displacement impeller pump with pumping rate equivalent to water at the same pump speed.

Example 48

Four formulations of ammonium polyphosphate type fire retardants containing an aqueous suspension of red iron oxide were prepared. Three of the formulations included 2.0% (1.22% color pigment solids) of the aqueous suspension. The fourth contained 4.0% (2.44% color pigment solids) of the aqueous suspension. The four formulations were compared with similar formulations containing 1.2% of a dry-powder red iron oxide colorant.

The formulations were prepared by adding all of the dry components to the concentrated liquid ammonium polyphosphate while mixing. In formulations containing aqueous suspended pigments, the suspension was added last. The mixed formulations were allowed to set overnight prior to further analysis in order to dissipate air entrained during the mixing operation. After setting overnight, the samples were homogenized, sampled and analyzed as described herein. Representative samples of the concentrated formulations were diluted to use strength by admixing one volume of the concentrated formulation with five volumes of tap water. The results are shown below in Table 29.

TABLE 29

Impact of Liquid Iron Oxide Colorant on Aluminum Corrosion of Ammonium Polyphosphate Based Long-Term Fire Retardants.

| | A | B | C | D | E | F | G |
|---|---|---|---|---|---|---|---|
| COMPOSITION (% by weight) | | | | | | | |
| Ammonium Polyphosphate | 100.0 | 97.1 | 94.1 | 96.3 | 93.3 | 91.3 | 91.9 |
| Attapulgus Clay | | 1.4 | 1.4 | 1.4 | 1.4 | 1.4 | 2.8 |
| Tolytriazole | | 0.3 | 0.3 | 0.3 | 0.3 | 0.3 | 0.3 |
| Ferric pyrophosphate (insol.) | | | 3.0 | | 3.0 | 3.0 | 3.0 |
| Iron Oxide Pigment | | 1.2 | 1.2 | | | | |
| Iron Oxide Suspension | | | | 2.0 | 2.0 | 4.0 | 2.0 |
| TOTAL | 100.0 | 100.0 | 100.0 | 100.0 | 100.0 | 100.0 | 100.0 |
| PROPERTIES Viscosity (mpy) | | | | | | | |
| Concentrate | 81 | 178 | 196 | 165 | 168 | 179 | 376 |
| Diluted Solution | 4 | 7 | 8 | 8 | 8 | 8 | 13 |
| ALUMINUM CORROSION (mpy) Concentrate | | | | | | | |
| 70° F., total immersion | 5.5 | 0.6 | 0.5 | 1.0 | 0.5 | 0.8 | 0.4 |
| 70° F., partial | 3.6 | 0.7 | 0.5 | 1.1 | 0.5 | 0.6 | 0.4 |
| 120° F., total immersion | 101.0 | 2.8 | 1.2 | 1.0 | 0.7 | 0.7 | 0.6 |
| 120° F., partial | 65.3 | 1.4 | 0.5 | 1.4 | 0.5 | 0.4 | 0.5 |
| Dilute | | | | | | | |
| 70° F., total immersion | 12.3 | 2.7 | 2.3 | 2.6 | 1.8 | 2.0 | 2.1 |
| 70° F., partial | 8.0 | 3.0 | 2.0 | 2.9 | 2.2 | 2.1 | 2.2 |
| 120° F., total immersion | 5.0 | 2.0 | 1.6 | 1.7 | 0.8 | 1.2 | 1.1 |
| 120° F., partial | 6.2 | 3.5 | 2.4 | 2.1 | 1.4 | 1.4 | 2.0 |

The results indicate that the aluminum corrosivity of the formulations containing the liquid color pigment was marginally lower than when the dry-powder iron oxide pigment was used.

In view of the above, it is seen that the various objects and features of the invention are achieved and other advantages and results are obtained. Variations and modification may be made to the various steps and compositions of the invention without departing from the scope of the invention.

What is claimed is:

1. A method of optically marking fuel comprising:
    adding an aqueous dispersion of a non-fugitive pigment to an uncolored fire retardant composition in an amount effective to colorize said uncolored fire retardant composition;
        wherein said pigment is insoluble;
        wherein said aqueous dispersion is a slurry or a suspension; and
        wherein said aqueous dispersion is added at a time proximate to discharging said colorized fire retardant composition to a fuel at a rate effective to colorized the uncolored fire retardant solution;
    discharging the colorized fire retardant solution to form a discharge;
    directing the discharge to mark the fuel;
    monitoring a parameter; and
    adjusting a rate that the pigment is added responsively to the monitored parameter.

2. The method of claim 1, wherein said parameter monitored is at least one of reflectance of the fuel, color of the colorized fire retardant solution, wind condition, ambient temperature, temperature of the fire, and smoking character of the fire.

3. The method of claim 1, wherein said pigment is red iron oxide.

4. The method of claim 1, wherein said pigment is titanium dioxide.

5. The method of claim 1, wherein said colorant further comprises at least one opacifier.

6. The method of claim 1, wherein said colorant further comprises at least one filler pigment.

7. The method of claim 1, wherein said pigment has an average particle diameter less than about 1 micrometer.

8. The method of claim 1, wherein said pigment has an average particle diameter less than about 5 micrometers.

9. The method of claim 1, wherein said pigment has an average particle diameter in the range of about 0.35 to about 0.55 micrometer.

10. The method of claim 1, wherein said pigment has an average particle diameter in the range of about 0.35 to about 0.45 micrometer.

11. The method of claim 1, wherein said pigment is at least one of red iron oxide, yellow iron oxide, titanium dioxide, antimony oxide, potassium titanate, ferrite, iron cyanide blue and any combination thereof.

12. A method of optically marking fuel comprising:
    adding an aqueous dispersion of red iron oxide pigments to an uncolored fire retardant composition in an amount effective to colorize said uncolored fire retardant composition;
        wherein said pigments have an average particle diameter less than about one micrometer;
        wherein said aqueous dispersion is a slurry or a suspension; and
        wherein said aqueous dispersion is added at a time proximate to discharging said colorized tire retardant composition to a fuel at a rate effective to colorized the uncolored fire retardant solution;
    discharging the colorized fire retardant solution to form a discharge;
    directing the discharge to mark the fuel;
    monitoring a parameter; and
    adjusting a rate that the pigment is added responsively to the monitored parameter.

13. A method of optically marking fuel comprising:
    adding an aqueous dispersion of titanium dioxide pigments to an uncolored fire retardant composition in an amount effective to colorize said uncolored fire retardant composition;
        wherein said pigments have an average particle diameters less than about one micrometer;
        wherein said aqueous dispersion is & slurry or a suspension; and
        wherein said aqueous dispersion is added at a time proximate to discharging said colorized fire retardant composition to a fuel at a rate effective to colorized the uncolored fire retardant solution;
    discharging the colorized fire retardant solution to form a discharge;
    directing the discharge to mark the fuel;
    monitoring a parameter; and
    adjusting the rate that the pigment is added responsively to the monitored parameter.

* * * * *